United States Patent
Hofeldt

(10) Patent No.: US 11,143,590 B2
(45) Date of Patent: Oct. 12, 2021

(54) TIME-DOMAIN TERAHERTZ MEASUREMENT SYSTEM HAVING A SINGLE REFERENCE SURFACE

(71) Applicant: 3M INNOVATIVE PROPERTIES COMPANY, St. Paul, MN (US)

(72) Inventor: David L. Hofeldt, Oakdale, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 16/947,244

(22) PCT Filed: Mar. 14, 2019

(86) PCT No.: PCT/IB2019/052093
§ 371 (c)(1),
(2) Date: Jul. 24, 2020

(87) PCT Pub. No.: WO2019/180556
PCT Pub. Date: Sep. 26, 2019

(65) Prior Publication Data
US 2020/0408678 A1 Dec. 31, 2020

Related U.S. Application Data

(60) Provisional application No. 62/646,541, filed on Mar. 22, 2018.

(51) Int. Cl.
*G01N 21/3586* (2014.01)
*G01B 11/06* (2006.01)

(52) U.S. Cl.
CPC ......... *G01N 21/3586* (2013.01); *G01B 11/06* (2013.01)

(58) Field of Classification Search
CPC ................ G01N 21/3586; G01B 11/06; G01B 11/0691; G01B 11/02
See application file for complete search history.

(56) References Cited

U.S. PATENT DOCUMENTS 6,828,558 B1 12/2004 Arnone
6,957,099 B1 * 10/2005 Arnone ................ A61B 5/0059
250/330

(Continued)

OTHER PUBLICATIONS

International Search Report for PCT International Application No. PCT/IB2019/052093, dated Jul. 16, 2019, 2 pages.

*Primary Examiner* — David P Porta
*Assistant Examiner* — Fani Boosalis
(74) *Attorney, Agent, or Firm* — James A. Baker

(57) ABSTRACT

A time-domain terahertz (THz) measurement system includes a single reference surface. A reference beam providing the single reference surface is supported at two mounting points, at least one of which is a non-fixed mounting point to allow for thermal expansion of the reference beam. The system acquires an air scan profile of the single reference surface with no sample present at a first time, and a sample scan profile with the sample present at a second time. The system further performs a linear correction of the air scan profile using distance measurements at two reference points outside the boundaries of the sample collected at the time of acquisition of the air scan profile and the sample scan profile. The system measures one or more properties of a sample, including, for example, a thickness profile of the sample and an effective refractive index profile of the sample.

20 Claims, 14 Drawing Sheets

(56) References Cited

U.S. PATENT DOCUMENTS

| | | |
|---|---|---|
| 7,551,269 B2 | 6/2009 | Itsuji |
| 7,609,366 B2 | 10/2009 | MacHattie |
| 7,906,975 B2 | 3/2011 | Federici |
| 7,919,752 B2 | 4/2011 | Itsuji |
| 8,187,424 B2 | 5/2012 | Haran |
| 8,314,391 B2 | 11/2012 | Haran |
| 8,378,304 B2 | 2/2013 | Mousavi |
| 8,436,310 B2 | 5/2013 | Zimdars |
| 8,440,971 B2 | 5/2013 | Ouchi |
| 8,457,915 B2 | 6/2013 | White |
| 8,514,403 B2 | 8/2013 | Ogawa |
| 8,546,762 B1 | 10/2013 | Roehle |
| 9,068,819 B2 | 6/2015 | Kubota |
| 9,140,542 B2 | 9/2015 | Savard |
| 9,304,082 B2 | 4/2016 | Koizumi |
| 9,316,582 B2 | 4/2016 | Kubota |
| 9,360,296 B2 | 6/2016 | White |
| 9,588,041 B2 | 3/2017 | White |
| 2010/0102233 A1 | 4/2010 | Gelmond |
| 2012/0049070 A1 | 3/2012 | Mousavi |
| 2013/0037721 A1 | 2/2013 | Ouchi |
| 2013/0048859 A1 | 2/2013 | Scheller |
| 2015/0241340 A1* | 8/2015 | Kubota .............. G01N 21/3586 250/341.1 |
| 2015/0268030 A1 | 9/2015 | White |
| 2015/0323451 A1 | 11/2015 | King |
| 2017/0370833 A1* | 12/2017 | Markelz ................ G01N 21/03 |

\* cited by examiner

US 11,143,590 B2

TIME-DOMAIN TERAHERTZ MEASUREMENT SYSTEM HAVING A SINGLE REFERENCE SURFACE

CROSS REFERENCE TO RELATED APPLICATIONS

This application is a national stage filing under 35 U.S.C. 371 of PCT/IB2019/052093 filed Mar. 14, 2019, which claims the benefit of U.S. Application No. 62/646,541, filed Mar. 22, 2018, the disclosure of which is incorporated by reference in its/their entirety herein.

BACKGROUND

Time-domain Terahertz (THz) systems are useful for measuring various properties of a sample material. Such materials include films, non-woven materials, papers, abrasives, etc. A THz interrogation wave is generated, transmitted through a sample, and received by a detector, in such a way that the transit time associated with the interrogation wave propagating through the sample material can be measured. This can be done in either transmissive or reflective geometries, with possibly different benefits accruing to particular arrangements depending on the sample material and the THz generation and detection systems. But in either case, the transit time of the interrogation pulse through the sample, including multiple reflections that can occur due to interfaces in the sample, will be affected by various properties of the sample, including its total caliper (and layer) thickness(es) and refractive index profile(s). The transit time signals may therefore be used to measure these properties of a sample.

SUMMARY

In general, the present disclosure is directed to systems and methods for measuring properties of a sample using a time-domain terahertz system having a single reference surface. The properties that may be measured include, for example, a thickness profile of the sample, individual layer thicknesses of the sample, as well as effective refractive indices for the sample and/or it's layers.

In one example, the disclosure is directed to a time-domain terahertz measurement system, comprising a scanning frame, a single reference surface, a terahertz transmitter that outputs terahertz interrogation pulses into a sample area between the terahertz transmitter and the single reference surface at a first time, $T_a$, when no sample is present in the sample area, and that outputs terahertz interrogation pulses into the sample area at a second time, $T_b$, when the sample is present in the sample area, and a controller that acquires an air scan profile including pulses reflected from the single reference surface corresponding to the interrogation signals output at the first time, $T_a$, and that acquires a sample scan profile including pulses reflected from the single reference surface corresponding to the interrogation pulses output at the second time, $T_b$, and including pulses reflected from the sample corresponding to the interrogation pulses output at the second time, $T_b$, wherein the controller further acquires air distance measurements including pulses reflected at a first reference point $x_A$ on the single reference surface corresponding to the interrogation pulses output at the first time, $T_a$, and at the second time, $T_b$, and including pulses reflected at a second reference point $x_B$ on the single reference surface corresponding to the interrogation pulses output at the first time $T_a$, and at the second time, $T_b$, wherein the first reference point $x_A$ and the second reference point $x_B$ are points on the single reference surface that are outside of the sample area, wherein the controller further calculates a corrected air scan profile by performing a linear correction of the air scan profile received at the first time, $T_a$, based on the air distance measurements at points $x_A$ and $x_B$ received at the first time, $T_a$, and at the second time, $T_b$, and determines the thickness profile of the sample based on the corrected air scan profile and the sample scan profile.

In some examples, the single reference surface comprises one of a surface of a substantially planar reference beam and a surface of an idler roll.

In some examples, the reference beam is comprised of a material having a coefficient of thermal expansion of less than 20.0 ppm/° C.

In some examples, the time-domain terahertz (THz) measurement system of claim 1 further comprises a first support beam supporting the reference beam at a first mounting point, and a second support beam supporting the reference beam at a second mounting point, wherein at least one of the first mounting point and the second mounting point is a non-fixed mounting point.

In some examples, the first mounting point is a fixed mounting point and the second mounting point is a non-fixed mounting point.

In some examples, the reference beam is supported at a first mounting point and at a second mounting point, and at least one of the first mounting point and the second mounting point is a non-fixed mounting point.

In some examples, the non-fixed mounting point includes one of a slot and a flexure mount.

In some examples, the reference beam is comprised of one of stainless steel or Invar ($Fe_{0.64}Ni_{0.36}$).

In some examples, the terahertz transmitter and the terahertz receiver are housed within a terahertz probe head.

In some examples, the time-domain terahertz (THz) measurement system further comprises a carriage slidably moveable along the scanning frame, the THz probe head mounted to the carriage to be slidably moveable along the scanning frame.

In some examples, the controller further calculates an effective refractive index profile of the sample based on the thickness profile of the sample.

In some examples, the controller further calculates at least one of a composition, a density, a mass, a void fraction, a mass fraction, a volume fraction, a mass per unit area, and a porosity of the sample based on the thickness profile of the sample.

In some examples, the thickness profile of the sample may be input to control a manufacturing process.

In another example, the disclosure is directed to a method of determining a thickness profile of a sample, comprising outputting terahertz interrogation pulses into a sample area of a terahertz measurement system at a first time, $T_a$, when no sample is present in the sample area, receiving an air scan profile including pulses reflected from a single reference surface corresponding to the interrogation signals output at the first time, $T_a$, outputting terahertz interrogation pulses into the sample area at a second time, $T_b$, when the sample is present in the sample area, receiving a sample scan profile including pulses reflected from the single reference surface corresponding to the interrogation pulses output at the second time, $T_b$, and including pulses reflected from the sample corresponding to the interrogation pulses output at the second time, $T_b$, receiving air distance measurements including pulses reflected at a first reference point $x_A$ on the single reference surface corresponding to the interrogation pulses output at the first time first time, $T_a$, and at the second time, $T_b$ and including pulses reflected at a second reference point $x_B$ on the single reference surface corresponding to the interrogation pulses output at first time, $T_a$, and at the second time, $T_b$, wherein $x_A$ and $x_B$ are points on the single reference surface that are outside of the sample area, calculating a corrected air scan profile by performing a linear correction of the air scan profile received at the first time, $T_a$, based on the air distance measurements received at the first time, $T_a$, and at second time, $T_b$, and determining the thickness profile of the sample based on the corrected air scan profile and the sample scan profile.

In some examples, the reference beam is comprised of a material having a coefficient of thermal expansion of less than 20.0 ppm/° C.

In some examples, the reference beam is supported at a first mounting point and at a second mounting point, and wherein at least one of the first mounting point and the second mounting point is a non-fixed mounting point.

In some examples, the first mounting point is a fixed mounting point and the second mounting point is a non-fixed mounting point.

In some examples, the method further includes calculating an effective refractive index profile of the sample based on the thickness profile of the sample.

In some examples, the method further includes calculating at least one of a composition, a density, a mass, a void fraction, a mass fraction, a volume fraction, a mass per unit area, and a porosity of the sample based on the thickness profile of the sample.

In some examples, the method further includes controlling a manufacturing process based on the thickness profile of the sample.

The details of one or more examples are set forth in the accompanying drawings and the description below. Other features and advantages will be apparent from the description and drawings, and from the claims.

DETAILED DESCRIPTION

In general, the present disclosure is directed to systems and methods for measuring one or more properties of a sample using a time-domain terahertz (THz) measurement system having a single (one) reference surface. The properties may include, for example, a thickness profile of the sample and an effective refractive index profile of the sample, as well as propagation times, thicknesses, or refractive index values for individual layers in the sample.

Other example properties of the sample that may be determined by the THz measurement system include a composition, a density, a mass, a void fraction, a mass fraction, a volume fraction, a mass per unit area, and a porosity, among other properties of the sample.

Figure 1:
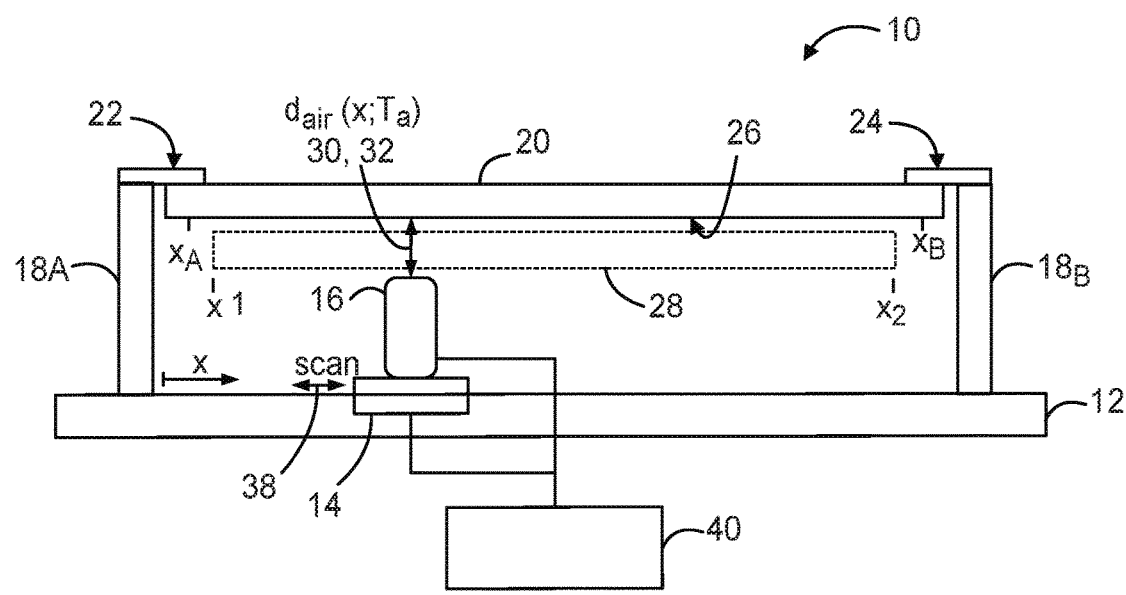
FIG. 1 is a schematic of an example time-domain THz measurement system designed to scan a sample and configured in a reflective geometry in accordance with the present disclosure.

FIG. 1 is a schematic of an example THz measurement system 10 having a single reference surface 26 in accordance with the present disclosure. System 10 includes a scanning frame 12 that supports a moveable carriage 14 having a THz probe head 16 mounted thereon. THz probe head 16 includes a THz transmitter and a THz receiver. Two support beams 18A and 18B are mounted to scanning frame 12 and support a reference beam 20. A first (front) side of reference beam 20 provides a single reference surface 26. A sample plane or sample area 28 is located between single reference surface 26 and THz probe head 16.

Figure 2:
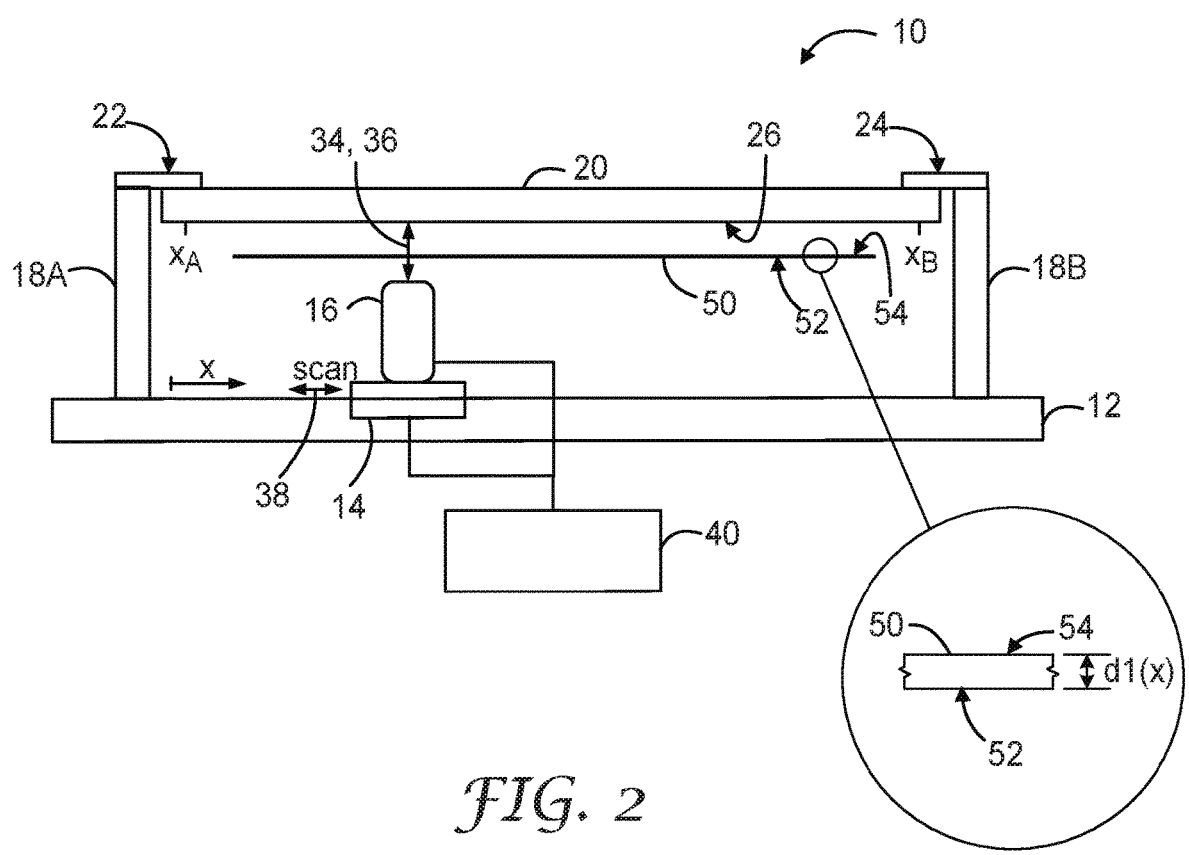
FIG. 2 is a schematic of the example THz measurement system of FIG. 1 with a material sample in the sample area.

In this example, although reference beam is shown as being supported by two support beams 18A and 18B, it shall be understood that reference beam may be supported in any manner with respect to the scanning frame to form a sample area between the terahertz probe head 16 and the single reference surface, and the disclosure is not limited in this respect. In addition, although FIGS. 1 and 2 show a reflective geometry, the disclosure is not limited to reflective geometries, and may also apply to transmissive geometries as well. In addition, although the single reference surface 26 is shown as being provided by a substantially planar reference beam 20, it shall be understood that other components may be used to provide single reference surface 26, such as an idler roll or other mechanical component of a web processing system.

Single reference surface 26 is the only reference surface in THz measurement system 10. In other words, THz measurement system 10 includes only one reference surface, reference surface 26, positioned behind or below the sample plane 28 with respect to THz probe head 16 as shown in FIGS. 1 and 2.

System 10 is configured such that accurate measurements of sample properties may be made using only single reference surface 26. The system described herein helps ensure that the distance profile between the THz probe head 16 and the reference surface is maintained consistently throughout manufacturing operations that occur across extended time periods, so that accurate data for determination of the sample properties may be obtained.

In this example, THz probe head 16 includes a THz transmitter and a THz detector or receiver in a single probe head 16. It shall be understood, however, that THz transmitter and THz receiver may be mounted separately. The THz transmitter generates one or more THz interrogation pulses 30. The THz receiver detects corresponding reflected THz signals 32. The THz transmitter may include, for example, an ultrafast pulsed laser pump that generates an outgoing THz interrogation pulse that lasts in the range of 0.1-10 ps (picosecond). The detected time sweep range of interest at the THz detector is in the range of 2-1000 ps with sampling resolutions of less than, for example, 0.1 ps. 0.05-0.1 ps sampling resolution is typical to achieve thickness resolutions to micron and even sub-micron scales, but in general, the sampling resolution will scale with the duration of the THz interrogation pulse.

Carriage 14 is slidably mounted to scanning frame 12 such that THz probe head 16 may be translated along scanning frame 12 in a substantially fixed path, defined as the x-axis, across the width of reference beam 20 as indicated by arrow 38.

In one example configuration, reference beam 20 is supported by a first support beam 18A at a first mounting point 22 and by a second support beam 18B at a second mounting point 24. The first and second mounting points 22, 24 may be at the ends or near the ends of reference beam 20. In some examples, at least one of the first point 22 and the second point 24 are non-fixed to permit thermal expansion of the reference beam. The non-fixed mounting point(s) allows for thermal expansion of reference beam 20 without bowing or distortion of the overall beam profile, thus helping to maintain a substantially flat profile/shape of single reference surface 26 across the width of reference beam 20. In one example, first point 22 is a fixed mounting point and second point 24 is a non-fixed mounting point. To that end, reference beam may be mounted with a pin or a bolt at first mounting point 22 and through a slot or a flexure mount, or mechanism for isolating reference beam 20 from mechanical and thermal effects, at second mounting point 24. In another example, both mounting points 22, 24 may be non-fixed mounting points. There are of course a multitude of ways to support the reference beam, and the disclosure is not limited in this respect, but the reference beam should be supported such that its shape neither distorts nor grows substantially such that the linear correction to the air scan profile as described herein is not valid.

A THz measurement system controller 40 is connected to control carriage 14 and THz probe head 16. During a measurement window, system controller 40 controls movement of the carriage 14 in the x-direction along the width scanning frame 12, generation of the THz interrogation pulses by the THz transmitter in THz probe head 16, and acquisition of the corresponding reflected THz signals by the THz receiver in THz probe head 16. THz system controller 40 also includes programmed modules which, when executed by one or more processors, determine one or more properties of reference surface 26 and/or a sample material based on the time delay between the launching of the THz interrogation pulse(s) and the corresponding received reflected THz signal(s).

To reduce the potential for distortions of reference beam 20 and thus reference surface 26, support beams 18A and 18B connect reference beam 20 to scanning frame 12 in a manner that allows both reference beam 20 and support beams 18A and 18B to expand and contract by small amounts with changes in temperature without distorting their shape. To that end, reference beam 20 is connected to support beams 18A and/or 18B at mounting points 22, 24 in a manner that allows for thermal expansion of reference beam 20 without bowing or distortion of the overall reference beam profile. In the example described above, at least one of mounting points 22, 24 are non-fixed to allow for thermal expansion of reference beam 20 while reducing the potential for distortion of the overall reference beam profile. First and second support beams 18A and 18B are mounting to scanning frame 12 such that any changes in the scanning frame profile will be transferred to the support beams 18A and 18B and to reference beam 20, thus reducing the amount of change in the distance profile (the distance between the THz probe head and the reference surface 26 as a function of x measured across the width (x-direction) of the reference beam) between scanning frame 12 and reference beam 20. The goal is to maintain a fairly consistent distance profile over time between the two beams (that is, scanning frame 12 and reference beam 20). As that distance profile is dominated by changes in the heights of the two support beams, 18A and 18B, the example system set up shown in FIGS. 1 and 2 helps to minimize the potential for distortions in scanning frame 12 and/or reference beam 20 and thus any changes to the distance profile between them.

In other examples, if either scanning frame and/or the reference beam were mounted such that they did bow or warp due to thermal expansions, and if such mounting was done such that the bowing or warping was repeatable, one could calibrate the resulting distortion(s) as a function of ambient temperature, for example. In this way, air scan profiles could be computed from theoretical models that would account for beam distortions taking into account the means by which the frame and reference beam were supported and taking into account such things as beam loading and temperature; alternatively, air scan profiles could be recorded and stored in a dictionary as a function of, for example, input temperature, sensor loading, and air scan distances at $x_A$ and $x_B$, and then the updated profile could be computed from previous profiles and these factors. Still another method might incorporate data from multiple air scan profiles obtained under any number of ambient conditions and loading factors and use machine learning algorithms to predict the updated profile based on previous profiles and current conditions. While possible, such an implementation may require more initial calibration, as well as measurements to ensure that the initial calibrations remain valid or to allow updated calibrations to be performed.

In the example of FIG. 1, the support beams 18A and 18B and the reference beam 20 are made of materials with relatively low coefficient(s) of thermal expansion (CTE), such as for example stainless steel or Invar ($Fe_{0.64}Ni_{0.36}$, nominal composition 64% Fe, 36% Ni). In some examples, scanning frame 12 is also made of a low CTE material, but it may be made of a conventional steel. For example, Invar has a coefficient of thermal expansion, a, measured between 20° C. and 100° C., of about 1.2 ppm/° C. As another example, commercially available stainless steels may have a CTE of between 8-20 ppm/° C. In general, support beams 18A and 18B, and/or reference beam 20 may be made of any suitable material having a CTE of less than 20.0 ppm/° C., less than 10.0 ppm/° C., less than 2 ppm/° C., or even lower if such materials become available. Lower CTEs not only reduce the potential for distortion of the reference surface 26, but they may also help to ensure that the transverse locations of any surface features on reference surface 26 of reference beam 20 remain in the same relative x-locations.

To further help minimize variations in the distance between the THZ probe head 16 and reference surface 20, carriage 16 may be attached to scanning frame 12 using bearings and the like to minimize angular variations in the pointing direction of the THz beam emitted from THz probe head 16 relative to reference surface 26. Such means are well known to those skilled in the art. Maintaining the angular orientation of the probe head beam relative to the reference beam 20 reduces any change in the orientation that would result in changes to the distance profile between the scanning frame and the reference surface, increasing the reliability of a stable distance profile over time. In some examples, mounting the sensor horizontally off the scanning beam may provide improved angular stability; however, this configuration is not always possible in the manufacturing process.

The accuracy and resolution of the transverse position of the scanning probe head, i.e., its x-position, may also be chosen to reduce errors associated with obtaining an accurate scan profile over time. This position is not in generally directly coupled to anything on the reference surface, so the system maintains accurate relative x-positions between the carriage and the reference surface. In general, scanning frame systems use an encoder of some form to determine the x-position of the probe head at any given instant (such as counters attached to the drive motor, glass scale or measurement tapes, coordinate measurement devices or optical interferometers). Any error in the recorded position of the probe head as indicated by the encoder relative to the reference beam can result in an error in the $d_{air}(x)$ values (the distance profile between the THz probe head and the reference surface 26) shown in FIG. 1. To illustrate this, assume that the air scan profile as measured in FIG. 1 is not perfectly flat, such that there is some variation in slope, $\delta_{air}/\delta x$, for example, as might be caused by the reference beam or the scanning frame profiles, as a function of x along the scan. Then any error in the position of the probe head at location x as indicated by the encoder, call this $\Delta x$, results in an associated error in the corrected air scan distance, $\Delta d_{air}(x)$, where $\Delta d_{air}(x) = \Delta x \delta d_{air}/\delta x(x)$. Therefore, choosing encoders having an appropriate accuracy and resolution to minimize uncertainties in the probe head position $\Delta x$, as well as using appropriate matching operations to minimize variations in $\delta d_{air}/\delta x$ as a function of x, can both help to reduce errors associated with maintaining an accurate air scan profile over time.

The reference surface 26 of reference beam 20 that faces THz probe head 16 may be ground or polished to reduce surface deviations to a level consistent with the desired distance precision and the transverse resolution of the system. The transverse (x-direction or cross-web direction) resolution is determined by a combination of the uncertainty in the actual transverse sampling position of the scanning system (that is, the position of the THz probe head in the x-direction) and the Terahertz beam size. Typical transverse position uncertainties in industrial scanning frames are on the order of ±1 mm. Higher resolutions might be desirable for THz applications but aren't always practical. Since time-domain THz systems employ broadband sources that quite typically span the range of 0.05-5 THz and sometimes beyond, they must also contain a corresponding range of wavelengths, so the "spot size" of a focused THz beam is essentially a function of frequency. However, a 1 mm diameter can be used as a representative spot size for a focused beam for the purposes of this discussion (other spot sizes would exist in different beam geometries). The outer edges of the THz beam at the extremes of the spatial uncertainty cover a distance in this example of ±2 mm, or a total transverse distance of 4 mm. In this case, to make air scan distance measurements accurate to about ±1 microns, the local slopes on the surface should be kept to values less than about ±0.001/4=±0.25 mrad (milliradians). This may help to minimize the impact of any error in transverse position, and to ensure surface roughness of the reference beam does not contribute to a higher variance in the peak location determined from the THz waveform scan.

In some examples, the reference beam surface could in some cases be the surface of a stationary or rotating idler roll. In the case of the rotating idler roll, runout in the bearings and non-uniform surface profiles of the roll may contribute to uncertainties in the position of the surface of the idler roll, and any angular jitter in the probe head that shifts the beam with a component across the roll also contributes to change in the distance to the surface. Therefore, although this geometry can be used for some low-resolution cases, it may generally not produce the most precise results.

Still another means of reducing errors in the air scan profile over time could utilize a reference surface having a non-flat profile in certain areas of the reference beam; that is, which has recognizable surface features in $d_{air}(x)$ in the locations just outside the edges of the web sample. In this case, cross-correlations could be computed between an air scan profile that was recorded at a first time and an air scan profile recorded at a second, later time in the regions outside the edges of the web. These cross correlations could serve to provide corrections for changes in the lengths of the reference beam supports 18A and 18B as well as scanning head encoder uncertainties. In such an example, more data would have to be stored, and the profile of $d_{air}(x)$ in the locations just outside the edges of the web could not be flat. Since many manufacturing lines produce webs of variable width, the examples of FIGS. 1 and 2 implement a reference beam 20 with a flat profile across the entire beam; however, those skilled in the art will recognize that non-flat profiles can still be used even in the presence of encoder errors if the cross-correlation approach is employed.

In FIG. 1, system 10 acquires an air scan profile, $d_{air}(x, T_a)$, at a first time, $T_a$, that maps a distance profile as a function of x between THz probe head 16 and reference surface 26 with no sample present. The air scan profile is obtained by scanning THz probe head 16 along reference beam 20 to measure and record the distance between the THz probe head 16 and reference beam 20 as a function of x prior to inserting a sample web to be measured into the sample area 28. This effectively makes the path followed by THz probe head 16 the reference frame from which the air scan profile is measured.

FIG. 2 shows single reference surface THz measurement system 10 of FIG. 1 with a sample 50 to be measured present in sample area 28. Sample 50 includes a first major surface 52 and a second major surface 54 opposite the first major surface. Sample 50 may include a fixed length of a sample material or it may be a continuous sample from a manufacturing process, such as a web, that is threaded between THz probe head 16 and reference beam 20 into sample area 28. Either way, sample 50 is positioned in the sample area 28 substantially parallel to reference surface 26 between THz probe head 16 and reference surface 26. Sample 50 is suspended nominally horizontally below the reference surface if the THz propagation direction is vertical and the reference surface is horizontal, as indicated in FIG. 2. More generally, sample 50 is suspended normal to the THz beam path between THz probe head 16 and reference surface 20 for an arbitrary beam direction. Sample 50 can be suspended in any number of ways depending on the stiffness and characteristics of the sample. For example, a slotted tray may be used to support the sample(s) while allowing the THz beam to pass through unimpeded except for the sample, or the web plane can be controlled by idler rolls on the web manufacturing line, or any other suitable means of supporting the sample.

With the sample in place, system 10 acquires a sample scan profile, $d(x, T_b)$, at a second time, $T_b$, that measures and records propagation times from the THz probe head 16 to surfaces of the sample 50 (top, bottom, and any internal interfaces of the sample) as well as to the single reference surface 26, and the corresponding reflected THz pulses from each of those surfaces. The sample profile is obtained by scanning THz probe head 16 along sample 50 to record the propagation time profiles as a function of x with the sample present in sample area 28. THz probe head 16 generates THz interrogation pulses or waves 34 and detects corresponding reflected THz reflected signal(s) 36. The reflected THz signals of the sample scan profile, along with the reflected THz signals of the air scan profile, are processed by system controller 40 to determine various properties of the sample including, for example, the thickness profile of the sample material 50 as described herein.

At time $T_a$, when the air scan profile $d_{air}(x, T_a)$ was obtained, a propagation time profile for the THz wave to travel in air from the THz probe head to the reference surface and back, in the reflective geometry shown in FIG. 1, is recorded and converted to distance using the speed of light in air. At time $T_b$, the sample scan profile contains data on the propagation times in air from the probe head to the first major (front) surface 52 of the sample 50 and from the second major (back) surface 54 of the sample 50 to the reference surface 26. These distances are in air, and therefore, when they are converted to distance and summed together, they differ from the air scan profile (obtained with no sample present) by the thickness of the sample. Therefore, the total sample thickness can be obtained without using any of the transit time information in the sample, i.e., without material calibration factors, by subtracting the sum of the distances in air above and below the sample from the previously recorded air scan profile at each point along the scan.

As discussed above, the architecture of the single reference surface THz measurement system 10 of FIGS. 1 and 2 is designed to minimize changes in the distance profile between the THz probe head and the reference surface 26 between times $T_a$ and $T_b$. Because of thermal fluctuations and other variations that can occur between times $T_a$ (acquisition of the air scan profile) and $T_b$ (acquisition of the sample scan profile), the THz measurement system 10 of the present disclosure is further configured to determine a corrected air scan profile as described herein to ensure a stable air scan profile across time periods that exceed a few minutes, and in fact may span hours, days, or longer.

To that end, the sample scan profile taken at time $T_b$ also includes air distance measurements taken at each of two reference points, $x_A$ and $x_B$, that are outside the boundaries of the sample area 28, or are at least outside the boundaries of the sample 50. Because the x-positions of these reference points lie outside the boundaries of the sample, the distance information obtained at both times $T_a$ and $T_b$ is taken in air. Based on the air scan distance measurements at points $x_A$ and $x_B$ taken at times $T_a$ and $T_b$, the system may determine linear approximations of the reference beam profile at both times $T_a$ and $T_b$. A linear correction may then be applied to the air scan profile $d_{air}(x, T_a)$ to arrive at a corrected air scan profile $d_{air}(x, T_b)$ to account for any thermal or other fluctuations in the single reference beam profile over time periods that exceed a few minutes, and in fact my span hours, days or longer. This linear correction, the corrected air scan profile and how it is used in determining the thickness profile of a sample is described in more detail below. In general, $x_A$ and $x_B$ are independent of mounting points 22 and 24, although in some instances reference point $x_A$ may coincide with mounting point 22 and reference point $x_B$ may coincide with mounting point 24.

Figure 3:
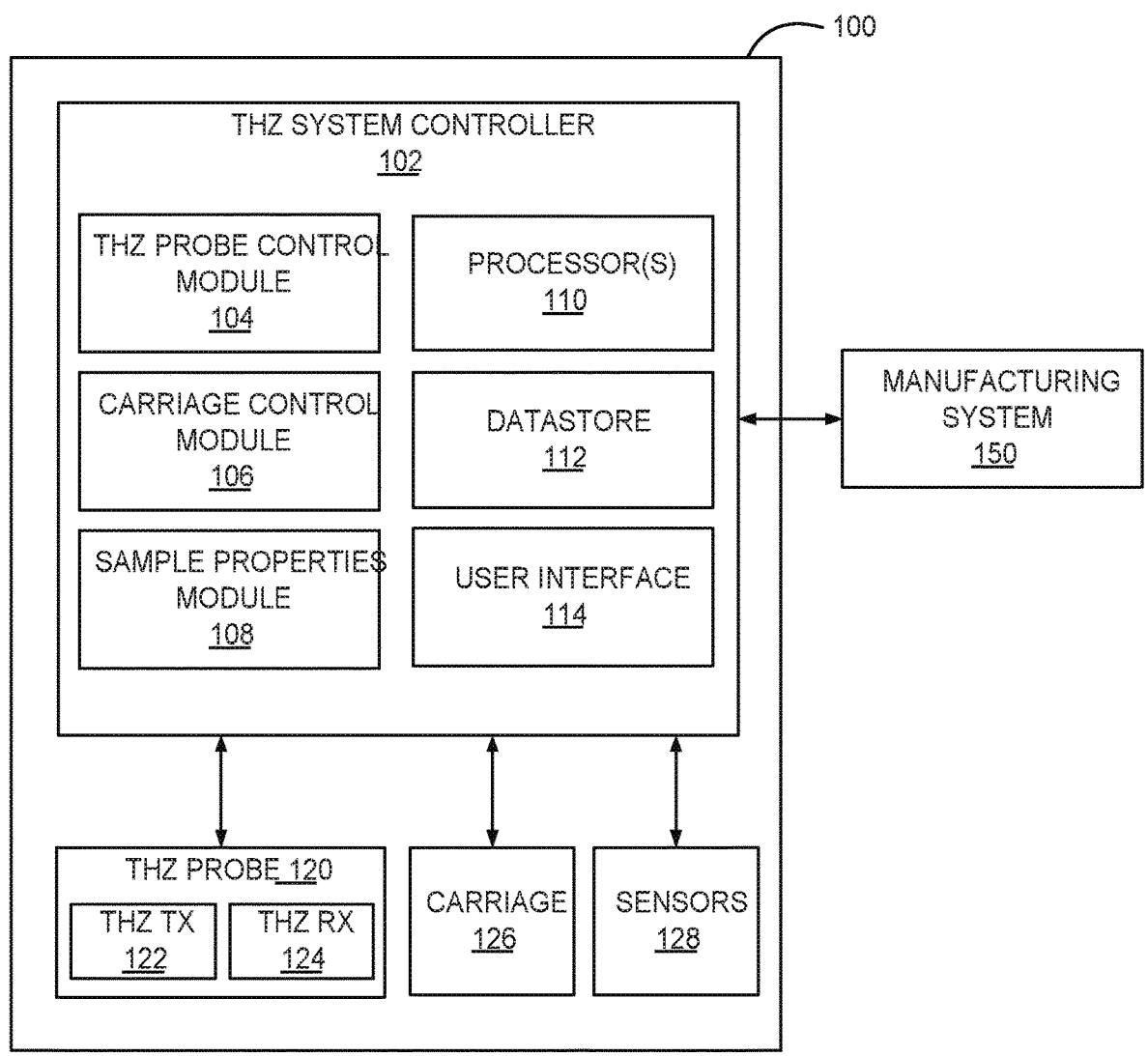
FIG. 3 is a block diagram showing the electronic components of an example time-domain THz measurement system in accordance with the present disclosure.

FIG. 3 is a block diagram showing the electronic components of an example single reference surface THz measurement system 100 in accordance with the present disclosure. System 100 includes a THz measurement system controller 102 (such as, for example, controller 40 shown in FIGS. 1 and 2), a THz probe head 120 (such as THz probe head 16 shown in FIGS. 1 and 2), and a moveable carriage 126 (such as carriage 14 shown in FIGS. 1 and 2) that slidably translates THz probe head 16 along a scanning frame. THz probe head 120 further includes a THz transmitter 122 that generates one or more THz interrogation pulse(s) and directs them toward single reference surface 26 (such as THz interrogation pulses 30 and 34 shown in FIGS. 1 and 2, respectively), and a THz receiver 124 that detects corresponding reflected THz reflected signal(s) (such as THz reflected signals 32 and 38 as shown in FIGS. 1 and 2, respectively).

System 100 may further include one or more sensors 128, such as temperature sensor(s) that measure the ambient temperature of the environment in which the measurement of the sample is to take place, and/or position sensor(s) that determine the x-direction position of the THz probe head, such as linear encoders, digital scales, displacement sensors, or the like.

THz system controller 102 includes one or more processors 110 configured to execute one or more software modules that control operation of the THz measurement system components, and that determine one or more properties of a sample material, such as total thickness profile of the sample, individual layer thicknesses, effective densities, refractive indices, etc., based on the air scan profile and the sample scan profile. A memory or datastore 112 includes storage for data that is used or generated by processor(s) 110 during execution of the one or more software modules.

A THz probe control module 104 controls THz probe transmitter 122 to generate the THz interrogation pulse(s) at the appropriate time(s), and controls timing acquisition of the reflected THz signals(s). A carriage control module 106 controls movement of carriage 126 along scanning frame. A sample properties module 108 includes instructions that, when executed by processor(s) 110, allow system controller 102 to determine one or more properties of a sample material, such as total thickness profile of the sample, individual layer thicknesses, effective densities, refractive indices, etc., based on the air scan profile and the sample scan profile.

A user interface 114 allows THz system controller 102 to receive instructions, commands, updates, and any other form of electronic communication from one or more users. For example, user interface 114 may include one or more display screens, touch screens, a keyboard, a mouse, a stylus, audible or visual indicators, or any other means for a user to electronically interact with a computing device. User interface 14 may also include one or more buttons, levers, dials, or other mechanical switches. Although user interface 114 is shown within the box delineating the THz system controller 102, it shall be understood that user interface 114 may also include one or more remote computing devices, such as laptop computers, desktop computers, tablet computers, remote server computers, mobile/smart phones or other mobile computing devices, pagers, or any other computing devices, through which a user may communicate with THz system controller 102.

Through user interface 114, a user may initiate acquisition of an air scan profile, initiate acquisition of a sample scan profile, initiate acquisition of two-point correction measurements, and may interrupt or cancel acquisition of any of these measurements. A user may also adjust, obtain or view system parameters such as the THz interrogation signal frequency, sampling times and frequencies, carriage scan speed, thresholds, the distance from the probe to the sample, the time window (i.e., distance from the probe) sampled by the system and any sub-windows therein which contain signal structures from the sample or reference surface, values for expected thicknesses or refractive indices of the sample or its layers, signal averaging, smoothing, or filtering parameters, reference waveforms, product recipes, and/or select the signal processing approach that is best suited to the sample structure, and/or any other parameters of the THz measurement system that may be adjusted by the user.

Through user interface 114, a user may further receive data acquired by or about the system or the sample. The data may include both raw data and one or more calculations based on the raw data. This data may include one or more spreadsheets, tables, graphs, diagrams, or any other suitable method of organizing or arranging data associated with the air scan profiles and/or the sample scan profiles, and/or the resulting analysis.

In some examples, THz system controller 102 may further communicate the results of the analysis, such as the determined thickness profile of the sample or any other determined properties of the sample, with a manufacturing system 150 to inform or control production of the sampled material. For example, if the sample thickness as measured by the THz measurement system 100 is outside of (e.g., either greater than or less than) one or more predetermined tolerances, one or more manufacturing variables in manufacturing system 150 may be adjusted to bring the produced material to within desired tolerances based on the thickness measurement(s) as determined by the THz system controller 102. Adjustment of the manufacturing process may be automatically performed by the manufacturing system 150 upon receipt of the sample thickness profiles, or they may be manually adjusted by a user upon receipt of one or more reports or output regarding the sample thickness profile(s) as measured by THz measurement system 100.

As discussed above, sample properties module 108 includes instructions that, when executed by processor(s) 110, allow system controller 102 to determine one or more properties of a sample material, such as a sample thickness profile, based on the air scan profile and the sample scan profile acquired by the system.

Figure 4:
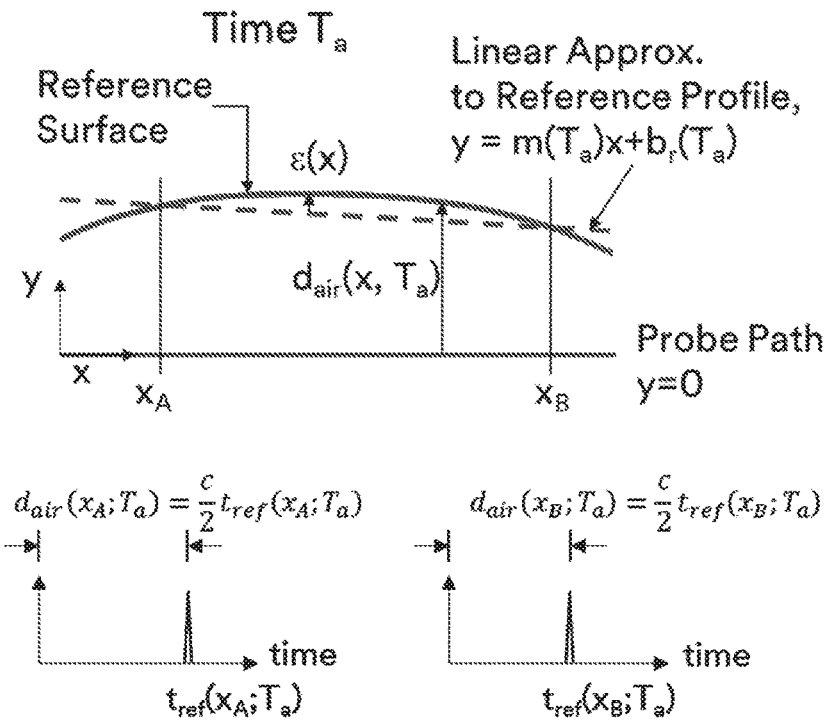
FIG. 4 depicts an air scan profile taken of a single reference surface and time waveforms at positions $x_A$ and $x_B$ at time $T_a$.
Figure 5:
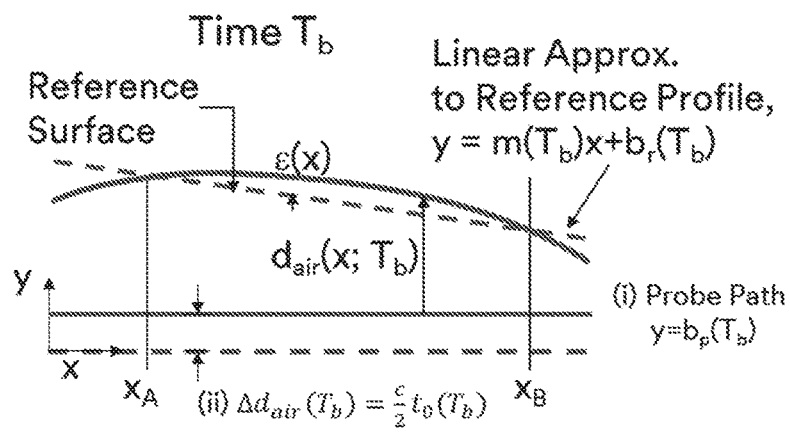
FIG. 5 depicts an air scan profile taken of a single reference surface and time waveforms at positions $x_A$ and $x_B$ at time $T_b$.
Figure 5:
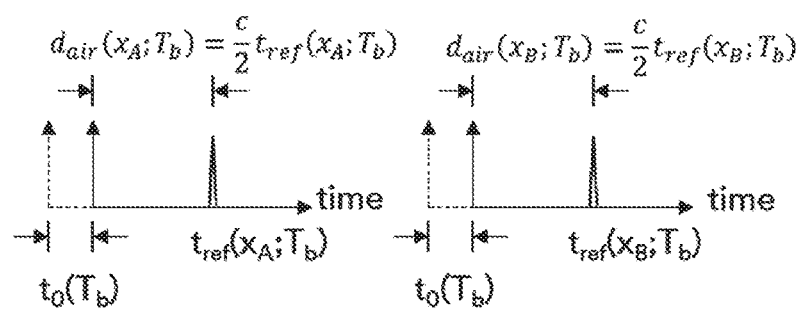

FIG. 4 depicts an air scan profile taken of a single reference surface and time waveforms at positions $x_A$ and $x_B$ at time $T_a$. FIG. 5 depicts an air scan profile taken of a single reference surface and time waveforms at positions $x_A$ and $x_B$ at time $T_b$. Since the distances are measured relative to the probe path, the probe path is assumed to be aligned with the y=0 position in the coordinate frame at time $T_a$. Furthermore, with no loss of generality, the zero time associated with the waveform at time $T_a$ is taken to be 0.

FIG. 4 depicts an air scan profile of a single reference surface, taken with no sample present at time $T_a$, which could be, for example, the beginning of a production shift or some time prior to a sample measurement. The air scan profile, $d_{air}(x; T_a)$ can be written as:

$$d_{air}(x; T_a) = \frac{c}{2n_{air}} t_{ref}(x; T_a) \cong \frac{c}{2} t_{ref}(x; T_a) \quad (1)$$

where $t_{ref}$ is the time of the peak of the reflected pulse from a position on the reference surface measured as a function of transverse position, x, as the translation stage moves, $n_{air}$ is the refractive index of air, which at room temperature and pressure for frequencies of about 1 THz is about 1.00028, which may be rounded to 1. The factor of 2 arises because the THz pulse must transit the distance a second time after reflecting from the reference surface. Similar equations can be used in general to relate the distance traveled to the wave speed in a medium and the propagation time.

Similarly, FIG. 5 depicts an air scan profile, taken at some other time, $T_b$. FIG. 5 shows an exaggerated displacement of the reference surface. The air scan profile, $d_{air}(x; T_b)$, at this later time can be written as:

$$d_{air}(x; T_b) = \frac{c}{2n_{air}} t_{ref}(x; T_b) \cong \frac{c}{2} t_{ref}(x; T_b)$$

FIG. 5 indicates that the probe path could have shifted between the two times, but if the probe path remains an undistorted version of the path followed at time $T_a$, or equivalently if the reference surface has an identical distortion, it doesn't matter, because the distance to the reference surface is measured relative to this path. FIG. 5 also indicates that there could be a shift in the "zero time" of the waveform between these two times. If many waveforms are acquired and displayed in quick succession, while for example the probe is stationary above position $x_A$, then the time of the pulse, $t_{ref}(x_A; T_b)$, might appear to jitter slightly. In accordance with the present disclosure, it has been determined that the timing jitter of the waveforms is relatively small, even when the probe is being scanned. Therefore, if a number of time delay waveforms are acquired in rapid succession before significant motion of the THz probe head or surface being measured occurs, then the average time of each of the reflected peaks in the signal may be computed. The averaging reduces the variance of the timing jitter, and, if the remaining variance is sufficiently precise, then in effect, the averaging moves the zero time reference of all the waveforms to zero. In other words, a THz measurement system in accordance with the present disclosure need only scan the profile of a single reference surface behind or below where the sample will eventually reside, as shown in FIGS. 1 and 2, for example. This can improve both waveform processing speed and measurement precision, as we only need to find and fit the time of one pulse and not two.

In accordance with the present disclosure, an air scan profile of the single reference surface taken at a first time, $T_a$, with no sample present, which, introducing averaging notation for the short term average to reduce timing jittery, may be written as:

$$d_{air}(x; T_a) = k_a [\overline{t_{ref}}(x; T_a) - \overline{t_0}(x; T_a)]$$

In Equation (3), $k_a = c/(2n_a)$, and a variable, $\overline{t_0}$, is included to account for longer term drift in the "zero time" of the time-domain waveform. A bar over the top of any variable represents a short time average which is conducted to remove timing jitter; in practice, this operation can occur as a "low-pass" filter whose domain is adjusted to smooth out the signal variations that occur across some (relatively small) number of consecutive scans. In effect, the "zero time" variable, $\overline{t}_0$, takes into account any slow (long-term) drift in the apparent time of where the peak of the reflected pulse from the single reference surface would appear independent of any actual change in the distance to the surface. Such a long-term drift could occur for example, due to small, long term variations in triggering of the waveform scan or due to long term differences in the relative delays associated with the generating and receiving optical fibers, amongst other factors. But if the probe head is left stationary over long periods of time, the distance to the single reference surface may also drift; in such a case, there is no way to tell if the drift is occurring due to a change in the zero time of the waveform or whether the distance to the reference surface is slowly changing (as indicated in FIG. 5). Air scan profiles that utilize a single reference surface and which are acquired within a relatively short time between air scans, for example tens of seconds to several minutes, are essentially identical. This indicates that the zero time associated with the low-pass filtered scan profile also doesn't vary appreciably as a function of transverse scan location or within the time required to make several transverse scans, so the x-dependence of the zero time may be removed as follows:

$$d_{air}(x;T_a)=k_a[\overline{t_{ref}}(x;T_a)-\overline{t}_0(T_a)] \qquad (4a)$$

Then at the second time, $T_b$, later in the day (or even days later), we would have $$d_{air}(x;T_b)=k_a[\overline{t_{ref}}(x;T_b)-\overline{t}_0(T_b)] \qquad (4b)$$

Assuming times $T_a$ and $T_b$ are separated by many minutes, hours, or even days, these single surface air scan profiles can differ if either the profile of probe head path or the profile of the reference surface changes between those times, or if the offset associated with the zero time changes between those times, or some combination thereof. Using a radar analogy, the system measures the height at which the probe head is flying above the "ground," i.e. the single reference surface. But, as indicated above, the distance calculated from the time waveform can be affected both by the relative distance between the single reference surface provided by the reference beam and the probe path as well as any drift in the zero time. The fact that both effects can be taken into account using the linear correction technique described herein allows the system of the present disclosure to utilize only a single reference surface while achieving very stable air scan profiles.

As shown in FIG. 5, regardless of whether the probe path shifts up to shorten the distance to the reference surface, or whether the zero time drifts such that the new waveform times are shorter than what they would have been if the zero time had remained the same as it was at time $T_a$, or some combination thereof, the relative distance calculated according to Equation 4(b) from the probe path to the reference surface, or any surface for that matter, will be shortened. Both the offset of the probe path and the zero time drift are only functions of time and not position, and so the net effect is combined in the new waveform graphs at all positions as shown in FIG. 5. In other words, the distances observed in the time waveforms from the new zero time at time $T_b$ can occur either because (i) the probe path has shifted by a constant amount, or (ii) there is an apparent shift in the position of the probe path associated with the drift in the zero time, $\overline{t}_0(T_b)$ of the waveform between times $T_a$ and $T_b$, or (iii) some combination of the above in which the effect is constant across all x locations in the scan.

It may be further assumed, in this example, that the profile of the single reference surface is relatively smooth and devoid of sharp features but is nevertheless not perfectly flat. It has been determined that if the single reference beam is supported in such a way as to not constrain the length of the beam (as described above with respect to FIGS. 1 and 2, for example), then the profile of the reference beam should not change much with normal changes in the ambient temperature typical of the applications in which the system is employed. The actual distances from the THz probe head to the reference beam at positions $x_A$ and $x_B$ would be expected to change on the order of tens of microns or more due to typical ambient thermal variations within a manufacturing environment, but if the length of the beam is not constrained and its cross-sectional profile is properly chosen, its surface profile should remain fairly constant without substantial distortion. If the room temperature increases, the length of the reference surface should expand, but this expansion is relatively small and will have little effect if the beam profile is indeed relatively smooth (as discussed above). For example, for a stainless steel reference beam having a CTE of about 16 ppm/° C., a 1 meter long reference beam would expand only about 0.5 mm across a relatively large 30° C. increase in ambient temperature. Stainless steel support beams that are 0.15 meters long would grow about 72 microns across the same temperature range.

In accordance with the present disclosure, two reference points on single reference surface 26, $x_A$ and $x_B$, are chosen such that they lie outside the boundaries of the sample area (and thus, outside the boundaries of the sample). For example, in FIGS. 1 and 2, the x-position of reference point $x_A$ is less than the x-position $x_1$ of the first end of sample area 28, and the x-position of reference point $x_B$ is greater than the x-position $x_2$ of second end of sample area 28. In this way, presence of a sample within sample area 28 will not result in any reflections of the THz interrogation signal at reference points $x_A$ and $x_B$, as there is no sample material between the THz probe and the single reference surface 26 at those x-positions, as shown in FIG. 2. Although for purposes of the present disclosure $x_A$ and $x_B$ are shown and described as being near the ends of the reference beam 26, the disclosure is not limited in this respect.

Returning to FIG. 4, the system measures the distances in air at reference points $x_A$ and $x_B$ at time $T_a$, $d_{air}(x_A; T_a)$ and $d_{air}(x_B; T_a)$. The profile of the single reference beam may be conceptualized as a line connecting points $x_A$ and $x_B$, coupled with a set of deviations, $\varepsilon(x)$, from that linear profile which comprise any deviations from linear profiles of either the probe path or the reference surface, and which are not functions of time. Using the above notation from Equation 4(a) at time $T_a$ with no sample present, the deviation profile, $\varepsilon(x)$, and the air scan profile may be computed as:

$$d_{air,linear}(x;T_a) = d_{air}(x_A;T_a) + [d_{air}(x_B;T_a) - d_{air}(x_A;T_a)]\frac{(x-x_A)}{(x_B-x_A)} \qquad (5a)$$

$$\varepsilon(x) = d_{air}(x;T_a) - d_{air,linear}(x;T_a) \qquad (5b)$$

$$d_{air}(x;T_a) = \qquad (5c)$$
$$d_{air}(x_A;T_a) + [d_{air}(x_B;T_a) - d_{air}(x_A;T_a)]\frac{(x-x_A)}{(x_B-x_A)} + \varepsilon(x)$$

A linear approximation to the reference beam profile at time $T_a$ is:

$$y=m(T_a)x+b_r(T_a).$$

At a second time, $T_b$, assume a sample 50 is in place within the sample area 28 such that the sample blocks access to directly measuring the beam profile except at locations outside the width of the sample, such as at positions $x_A$ and $x_B$ as shown in the example of FIG. 2. At this time, we may still accurately measure the distances in air at reference points $x_A$ and $x_B$, $d_{air}(x_A; T_b)$ and $d_{air}(x_B; T_b)$, as indicated in FIG. 5. A linear approximation to the reference beam profile at time $T_b$ is:

$$y = m(T_b)x + b_r(T_b).$$

Then, based on the assumptions stated above, the new linearly corrected air scan profile at time $T_b$ is:

$$d_{air}(x; T_b) = \varepsilon(x) + d_{air}(x_A; T_b) + [d_{air}(x_B; T_b) - d_{air}(x_A; T_b)] \frac{(x - x_A)}{(x_B - x_A)}. \quad (6)$$

This corrected air scan profile uses the apparent distances to the two reference points, $x_A$ and $x_B$, on the reference surface that lie outside the sample area at time $T_b$, and compares them to corresponding distances to the two reference points, $x_A$ and $x_B$, in the earlier air scan profile taken at time $T_a$ to create the corrected air scan profile along the entire scan. This two-point linear correction shifts the earlier air scan profile from time $T_a$ to create a new profile at time $T_b$ which is aligned with the new apparent distances, $d_{air}(x_A; T_b)$ and $d_{air}(x_B; T_b)$. This corrected air scan profile in accordance with the disclosure, which uses data from the terahertz sensor itself to measure the distances from the probe to the reference beam rather than some other sensor (s), corrects for drift in the zero time of the waveforms as well as shifts in the position of the probe path and permits accurate determination of the thickness profile of a sample using a single reference surface.

The two-point linear correction holds under conditions where it is reasonable to assume that the deviations from linearity of the probe head path profile and the reference beam profile do not change between scans; that is, $\varepsilon(x)$ is only a function of x but not a function of time. Some example of conditions that can break this constraint include maintenance, mechanical impacts, and improperly constructed scanning frame for the probe head or reference surface mounting such that their respective profiles might be distorted due to thermal expansion or contraction. Using structural tubing profiles to minimize torsional distortion in the carriage and a mounting configuration for the reference surface such as that indicated in FIG. 1 or 2, this can be realized. These and other conditions may be overcome with good engineering practices.

Although these examples describe using reference points $x_A$ and $x_B$ that lie outside the boundaries of the sample, it shall be understood that there are also other methods to perform this correction in accordance with the present disclosure. For example, segments of the reference beam that lie outside the sample, for example near or around points $x_A$ and $x_B$, could also be recorded and cross-correlated with the previously recorded air scan profile. Such cross correlations would not only correct for apparent changes in the single reference surface profile, but may have the added advantage of further reducing the impact of transverse positioning errors. Such cross correlations could also be used to correct for some small angular changes in the pointing direction of the probe carriage provided such angular changes were constant along x, and provided the deviation profiles were uniquely recognizable along these short segments for a small range of angular deviations that the system might conceivably undergo. Such a correction would include the acquisition of a sequence of controlled scans at slightly different probe head angles such that the respective unique $\varepsilon(x)$ segments could be characterized, and may also require the preparation of detailed surface features in these segments to create uniquely recognized sections. But with those calibrations and accurate probe head positioning information, the cross-correlation approach could achieve even slightly better precision. And even further, the segment information could be used in conjunction with mechanical models of the reference beam structure that would enable the computation of corrected reference beam profiles and the associated corrected air scan profiles that are not restricted to linear corrections.

Figure 9:
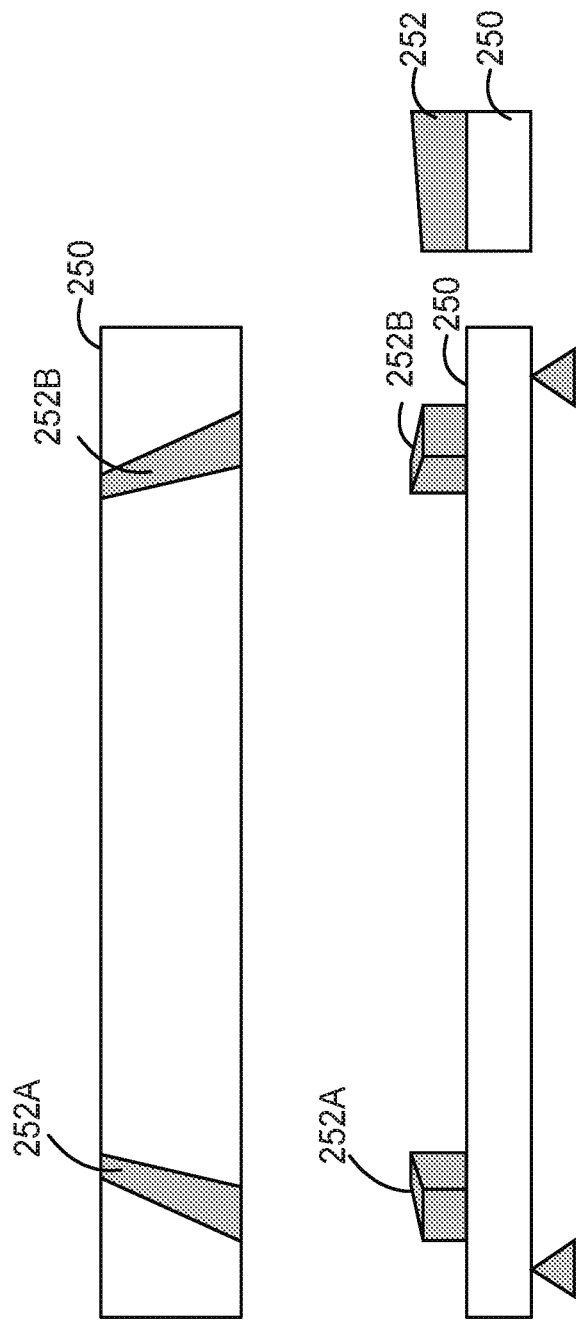
FIG. 9 shows another example reference beam including one or more steps or ridges.

As another example, a reference beam such as that shown in FIG. 9 may include one or more steps or ridges, such as ridges 252A and 252B. These may serve as spatial alignment feature(s) which correct for both x-movement and z-movement. The step or ridge features could be shaped or angled in one or both dimensions so that changes in angle from normal to the reference beam and the scan carriage could be detected.

Figure 6:
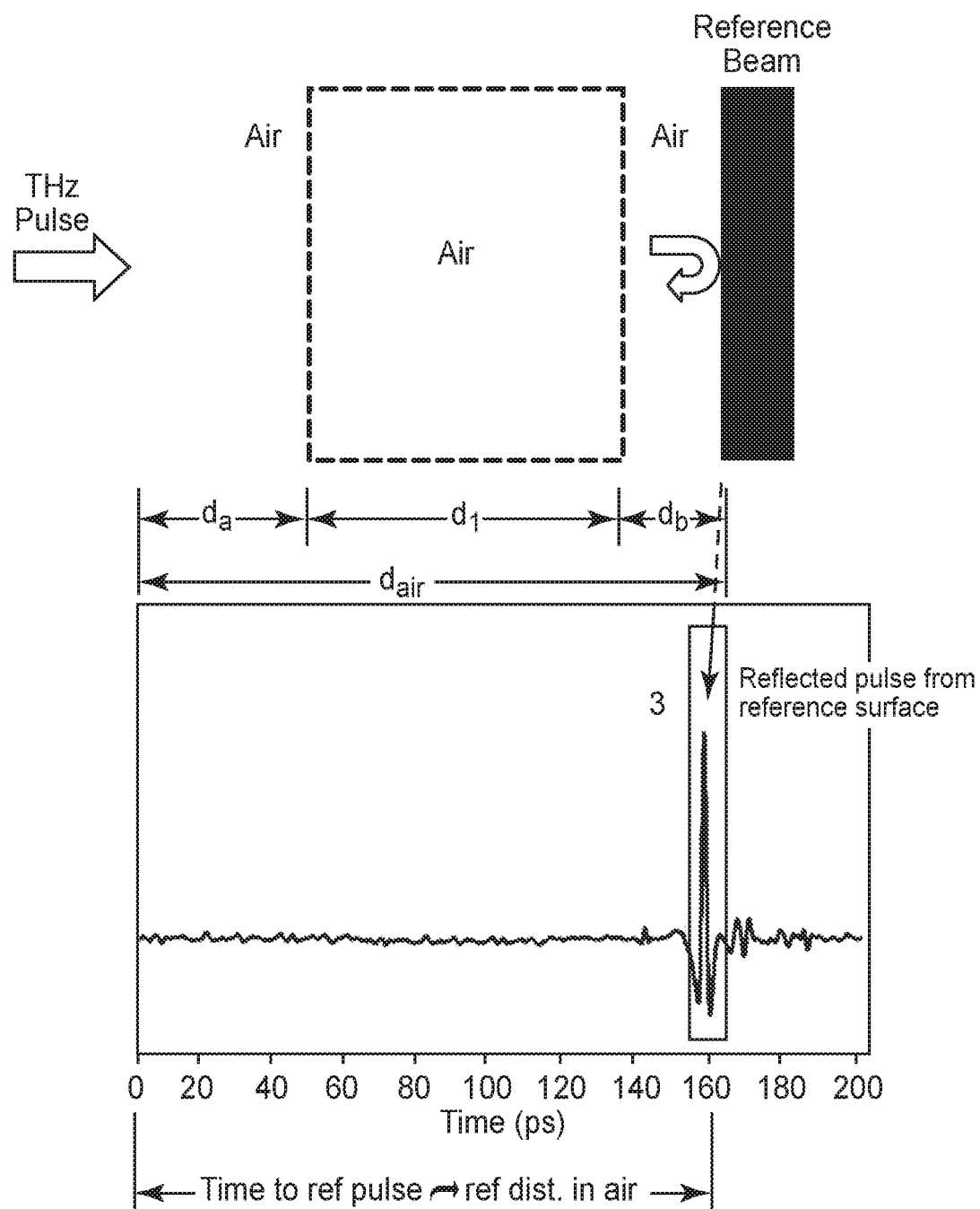
FIG. 6 shows a graph of an example waveform that may be acquired by the THz measurement system of the present disclosure during acquisition of an air scan profile with no sample present in the sample area.

FIG. 6 shows a graph of an example waveform that may be acquired by the THz measurement system of the present disclosure during acquisition of an air scan profile of a planar or linear single reference surface with no sample present in the sample area. During acquisition of an air scan profile, the THz transmitter outputs terahertz interrogation pulses into the (empty) sample area and toward the single reference surface. The single reference surface reflects a reflected terahertz pulse, which is in turn detected by the terahertz receiver.

Figure 7:
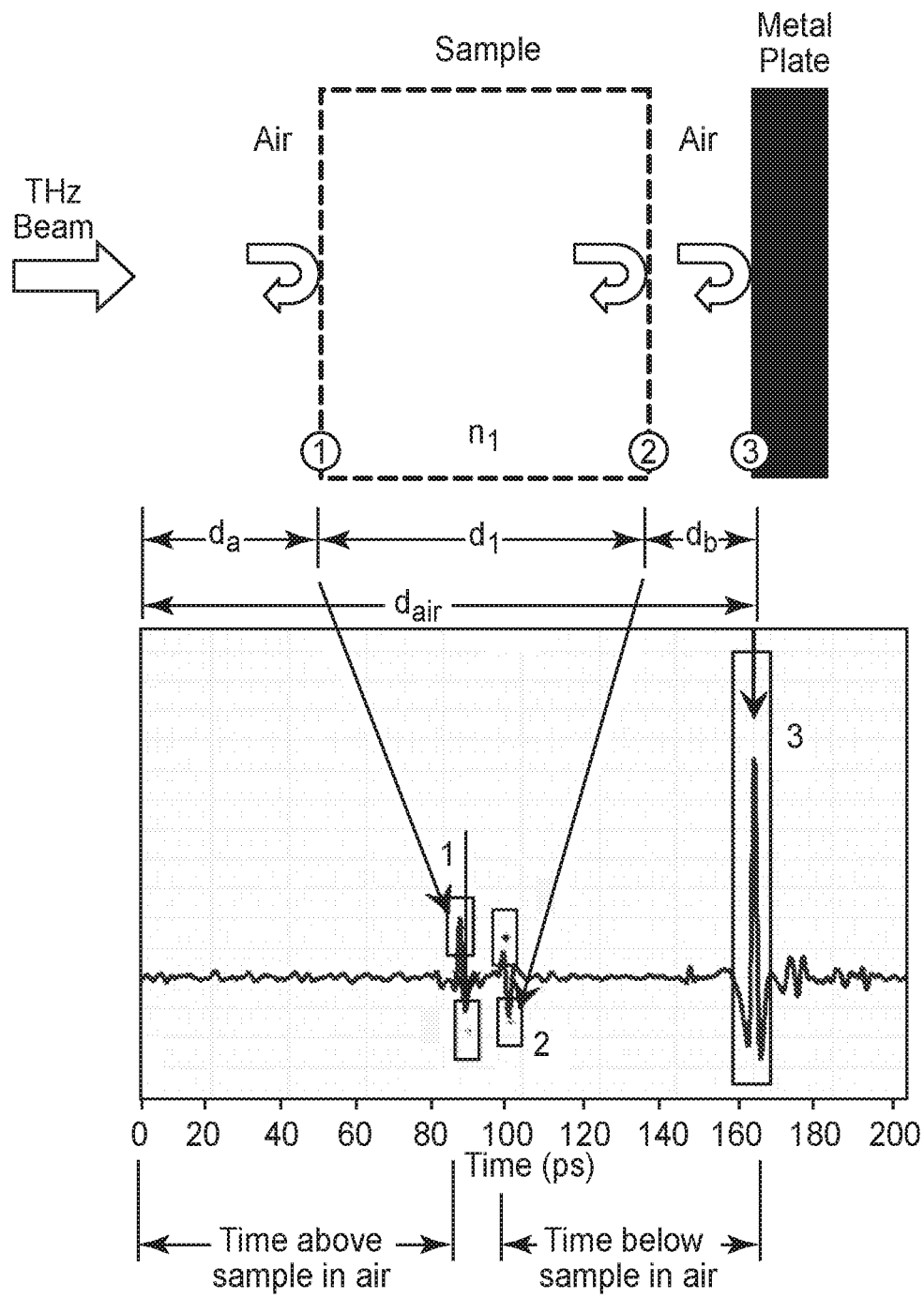
FIG. 7 shows a graph of an example waveform that may be acquired by the THz measurement system of the present disclosure during acquisition of a sample scan profile with a sample present in the sample area.

FIG. 7 shows a graph of an example waveform at a single point that may be acquired by the THz measurement system of the present disclosure during acquisition of a sample scan profile with a sample present in the sample area. During acquisition of a sample scan profile, the terahertz transmitter outputs terahertz interrogation pulses through the sample and toward the single reference surface. Pulse 1 represents a reflection from a first major surface of the sample (e.g., surface 52 as shown in FIG. 2), and pulse 2 represents a reflection from a second major surface of the sample (e.g., surface 54 as shown in FIG. 2). The single reference surface (e.g., single reference surface 26 as shown in FIG. 2) reflects a single reference surface reflected terahertz pulse 3, which is detected by the terahertz receiver.

In FIG. 7, the times above and below the sample, $d_a$ and $d_b$, respectively, are used together with the corrected air scan profile data to compute the thickness profile of the sample. First, the apparent distances to the reference surface at points $x_A$ and $x_B$ are computed from the respective time waveforms from the sample scan at time $T_b$. The system may then compute the corrected air scan profile for this time as described above. Then, referring to the waveform shown in FIG. 7, at any x-location where the sample resides where the reflected pulses from the top and bottom interfaces of the sample are identified, then the system may also compute the total sample thickness profile, $d_1(x; T_b)$, at time $T_b$ as:

$$d_1(x; T_b) = d_{air}(x; T_b) - k_a\{\overline{t_1}(x; T_b) + [\overline{t_3}(x; T_b) - \overline{t_2}(x; T_b)]\} \quad (7a)$$

$$d_1(x; T_b) = d_{air}(x; T_b) - \{d_a(x; T_b) + d_b(x; T_b)\} \quad (7b)$$

Since the corrected air scan profile utilizes the appropriate zero time for the waveform collected at time $T_b$, then it is correct to use the distance to the first major surface of the sample (as indicated by reference numeral 52 in FIG. 2) also using this time frame.

Once the thickness profile $d_1(x; T_b)$ for the sample has been determined, the system may further determine an effective refractive index profile, $n_1(x)$, using the profile of the propagation time through the sample, $\Delta t_s(x; T_b) = \overline{t}_2(x; T_b) - \overline{t}_1(x; T_b)$ obtained from the sample waveforms. This is possible because the waveforms give the time required to propagate through the sample, and the thickness profile, $d_1(x; T_b)$, is now known, with the effective wave speed of the THz beam in the sample, $c/n_1$, where c is the speed of light in vacuum. Here, the term "effective" is used to account for samples which might be homogeneous mixtures or structures as well as to account for dispersion across the range of terahertz frequencies used. Doing so gives:

$$n_1(x; T_b) = \frac{k_a\{\overline{t}_2(x; T_b) + \overline{t}_1(x; T_b)\}}{d_1(x; T_b)} \quad (8)$$

The effective refractive index values may be correlated with other material properties of interest such as a composition, a density, a void fraction, a mass fraction, a volume fraction, a mass per unit area, a porosity, or other property of the sample.

Another approach for calculating thickness utilizes the conventional time-of-flight approach, which utilizes reflections within the material, and for any layer in which these pulses can be adequately resolved and for which the refractive index(indices) of the layer(s) is known, the propagation times through the layer of material can be used together with the known refractive index of the layer to compute layer thickness. In this case, no reference surface is needed. If multiple layers exist in the sample, with all but one layer having known indices and recognizable reflections, then the thicknesses of those layers can be calculated using the propagation times in the waveform and their known indices. Then these layer thicknesses can be summed together with $d_a$ and $d_b$ (see FIG. 7), with the result in turn subtracted from the total sample thickness to give the thickness of the layer with the unknown refractive index. Once this thickness is known, the propagation time through that layer can be used to calculate its effective index as before.

Alternatively, if the effective refractive index of the sample material, $n_{eff}$, is known or can be calibrated ahead of time and does not change with time or position, the sample thickness can be computed using only the reference surface data taken during the air and sample scans; in other words, without the need to utilize pulses reflected from the sample surfaces. At any point in the sample scan where the THz beam passes through the sample material, the presence of the sample replaces the volume that was formerly occupied by air during the air scan. This effectively changes the time delay for the reference pulse to return, because the beam has to propagate through the sample, reflect from the reference surface, and return through the sample again. Using the value for the effective refractive index, $n_{eff}$, one can compute the thickness of the sample utilizing the delay in the reference pulse according to $$\Delta t(x; T_b) = \overline{t}_3(x; T_b) - \frac{d_{air}(x; T_a)}{k_a} \quad (9a)$$

$$d_1(x; T_b) = \frac{c\Delta t(x; T_b)}{2(n_{eff} - n_{air})} \quad (9b)$$

where $\overline{t}_3(x; T_b)$ is the time associated with the reflection from the single reference surface during the sample scan.

Figure 8:
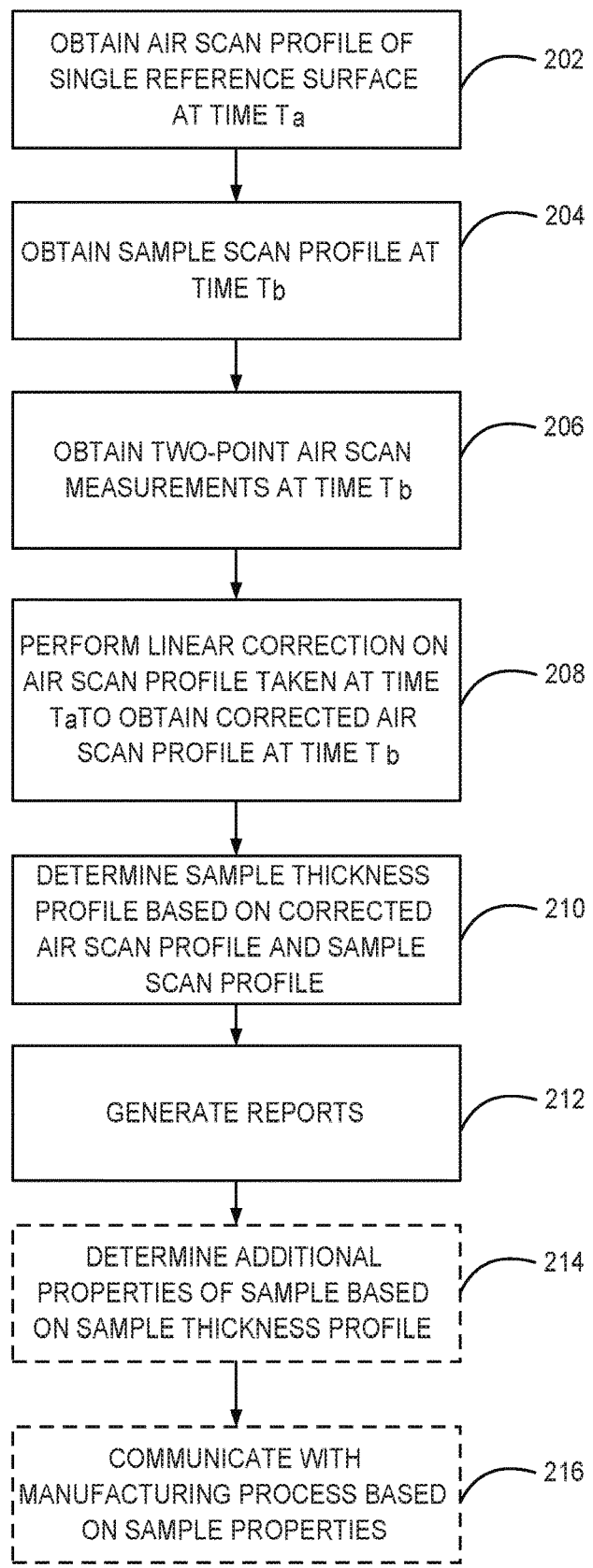
FIG. 8 is a flowchart illustrating an example process by which a time-domain THz measurement system may determine, for example, a total thickness profile of a sample.

FIG. 8 is a flowchart of an example process 200 by which a time-domain THz measurement system may determine, for example, a thickness profile of a sample. For example, process 200 may be stored as set of instructions in sample properties determination module 108 as shown in FIG. 3, that when executed by one or more processors (such as processor(s) 110 as shown in FIG. 3) permit a THz measurement system (such as THz measurement system 100 as shown in FIG. 3) to determine a thickness profile of a sample and/or one or more other properties of a material sample, such as a refractive index profile, a composition of the sample, a density of the sample, a mass of the sample, a void fraction of the sample, a mass fraction of the sample, a volume fraction of the sample, a mass per unit area of the sample, a porosity of the sample and/or any other related or correlated properties of a sample.

In accordance with process 200, a THz measurement system obtains an air scan profile of a single reference surface at a first time $T_a$ (202). The air scan profile may be acquired (with no sample present) by scanning a THz probe head 16 along the single reference surface 26 to measure and record the distance between the THz probe head 16 and single reference surface 26 provided by the reference beam as a function of x.

At a second time $T_b$, THz system controller obtains a sample scan profile (204) at time $T_b$. Time $T_b$ could be either before or after time $T_a$; however, for purposes of discussion, the time $T_b$ is described herein as being after time $T_a$. The sample scan profile is acquired with sample 50 present in sample area 28 by scanning a THz probe head at least across the width of the sample to record the distance between the THz probe head 16 and the upper (front) surface 52 and lower (back) surface 54 of the sample 50 as a function of x, and the delayed pulse from single reference surface 26 provided by the reference beam 20 as a function of x.

Also at time $T_b$, THz measurement system obtains distance in air measurements between the THz probe head and the reference surface at two reference points, $x_A$ and $x_B$, that are outside the boundaries or edges of the sample (206). In other words, THz system controller obtains the distance measurements $d_{air}(x_A; T_b)$ and $d_{air}(x_B; T_b)$ as described herein above.

The THz measurement system may next perform a two-point linear correction on the previously measured air scan profile taken at time $T_a$, $d_{air}(x; T_a)$ based on the distance measurements $d_{air}(x_A; T_b)$ and $d_{air}(x_B; T_b)$ (208). The corrected air scan profile, $d_{air}(x; T_b)$, is given by equation (6) as described above.

The THz measurement system may then determine a thickness profile of the sample based on the corrected air scan profile and the sample scan profile (210). The sample thickness profile is given by Equation (7a) or (7b) as described above.

The THz measurement system may further generate, and/or present on a user interface, one or more reports of data acquired or generated by the system (212). For example, the system may present the data in one or more graphs, charts, tables, spreadsheets, or other form of data representation. The reports and the data shown therein may be generated automatically or may be generated or customized at the request of a user.

The THz measurement system may optionally determine additional properties of the sample based on the sample thickness profile (214). For example, the system may determine a refractive index profile of the sample, a composition of the sample, a density of the sample, a mass of the sample, a void fraction of the sample, a mass fraction of the sample, a volume fraction of the sample, a mass per unit area of the sample, a porosity of the sample, and/or any other related or correlated properties of the sample.

The THz measurement system may optionally communicate sample thickness profile data with a manufacturing system (such as manufacturing system 150 of FIG. 3) in order to inform or control production of the sampled material (216). For example, if the sample thickness profile as measured by the THz measurement system 10, 100 is outside of (e.g., either greater than or less than) one or more predetermined tolerances, one or more manufacturing variables in manufacturing system 150 may be adjusted, in response to a communication or command from THz measurement system 100, to bring the produced material to within desired tolerances. In some examples, manufacturing system 150 may automatically adjust one or more manufacturing variables in response to communication of the sample thickness profile or other data from the THz measurement system. Alternatively or in addition, one or more manufacturing variables may be manually adjusted by a user in response to receiving or viewing the reports and/or the data generated by the THz measurement system.

Terahertz measurement system(s) having a single reference surface in accordance with the present disclosure may provide several advantages over systems employing two reference surfaces. For example, single reference surface system(s) in accordance with the present disclosure include fewer optical components and may therefore be easier to set up and less prone to error than systems employing two reference surfaces. As another example, speed of signal processing may be improved as the system need only locate a single reflected peak. In addition, a system employing a single reference surface does not require a beamsplitter or a window, and therefore does not sacrifice any terahertz beam power to create a second reference pulse, as would occur either with a beamsplitter and/or a window. In addition, since neither a beamsplitter nor a window is used, a system having a single reference surface would have the full bandwidth of the terahertz beam available at the sample, thus potentially allowing smaller sample thicknesses to be measured than with conventional systems utilizing two reference surfaces.

Example

Figure 10A:
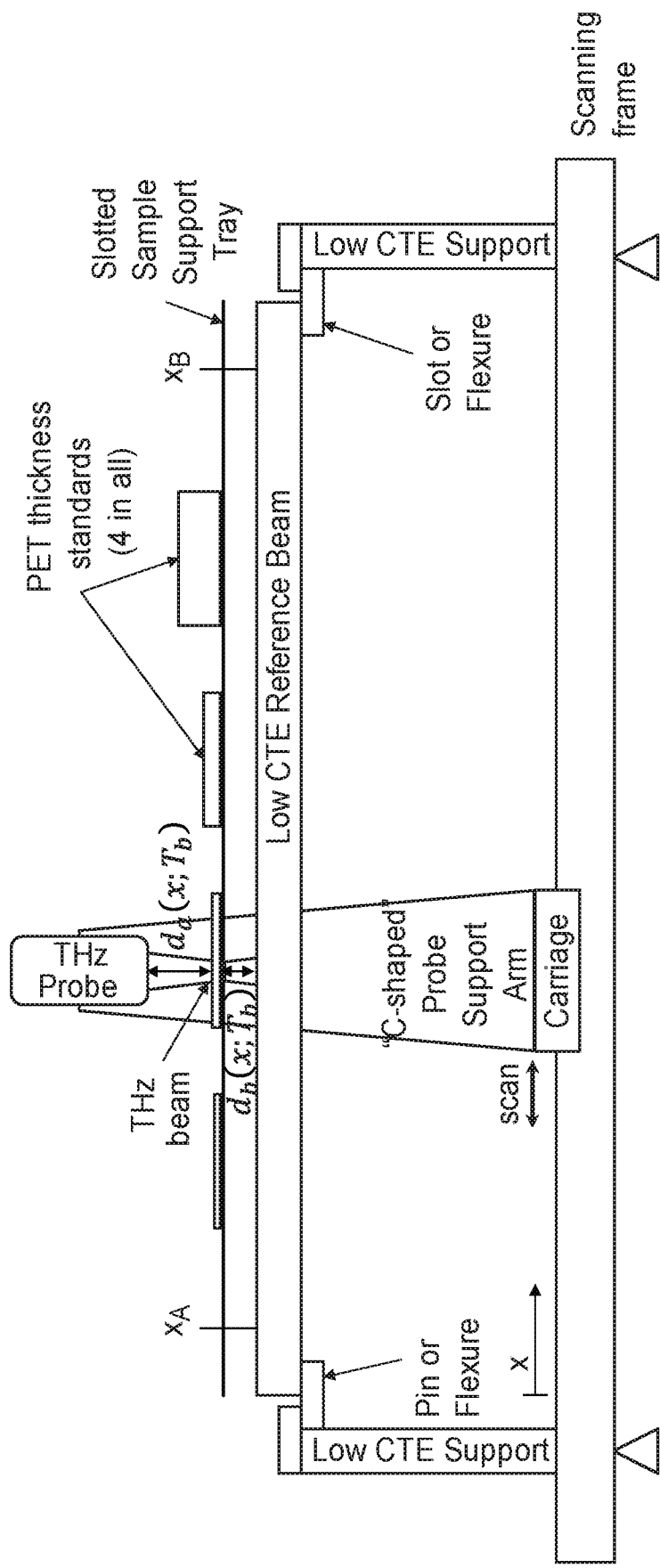
FIGS. 10A-10B show example THz measurement systems used to obtain example waveforms and comparative example waveforms in accordance with the present disclosure.
Figure 10B:
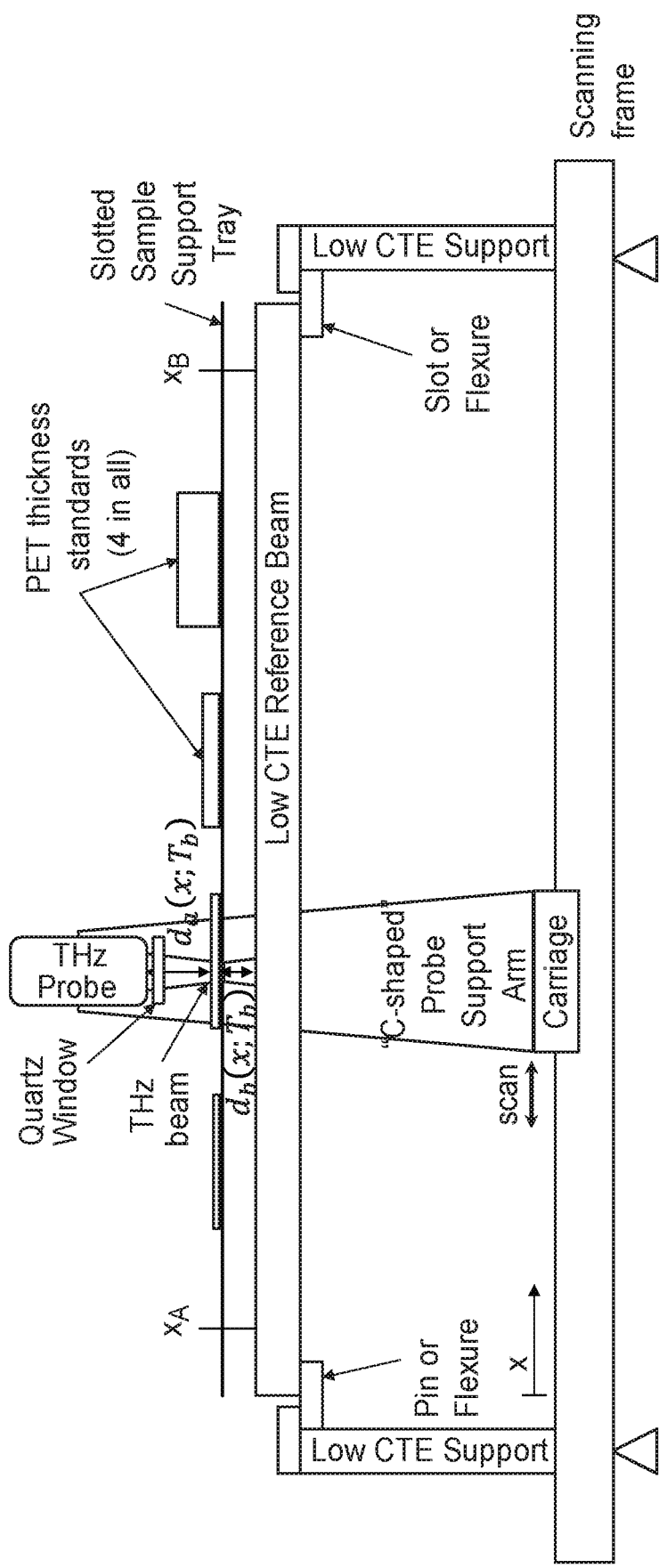

FIG. 10A shows another example single reference surface terahertz measurement system in accordance with the present disclosure, and which was used for purposes of this Example. For comparison purposes, FIG. 10B shows the terahertz measurement system of FIG. 10A, but which further includes a second reference surface, provided by a quartz window, positioned between the THz probe head and the sample(s), as is used in conventional terahertz measurement systems, for example as described in U.S. Pat. Nos. 8,457,915 and 9,360,296. In this Example, the probe support arm is "C-shaped". The THz beam passes through the slotted sample support tray (without interacting with it) and on to the reference beam, where it is reflected back to the probe. This configuration was used to collect air scan and sample scan data in which four separate PET standards were placed in the beam path for both the single reference surface measurements (FIG. 10A) and the two reference surfaces measurements (FIG. 10B). The slotted tray supports the samples without affecting the THz beam. The distances above and below the sample, $d_a(x; T_b)$ and $d_b(x; T_b)$ are indicated as used in equation (7).

In this Example, the terahertz sensor, acquired from Advanced Photonix Inc. of Ann Arbor, Mich., includes a terahertz control unit (TCU), TCU Model 5220, that generates and receives the THz signals, coupled with a T-Ray-4000 probe head. The software version was T-Ray Server v 1.4.4.0. The scanning frame, carriage and encoder were implemented using a linear stage Model MT300P, available from Aerotech, Inc. of Pittsburgh, Pa. The reference beam was implemented using an aluminum extrusion beam (Item Profile 8 80 MM×40 MM 6N Light #0.0.489.18), available from Item North America of Hagerstown, Md.

Figure 11A:
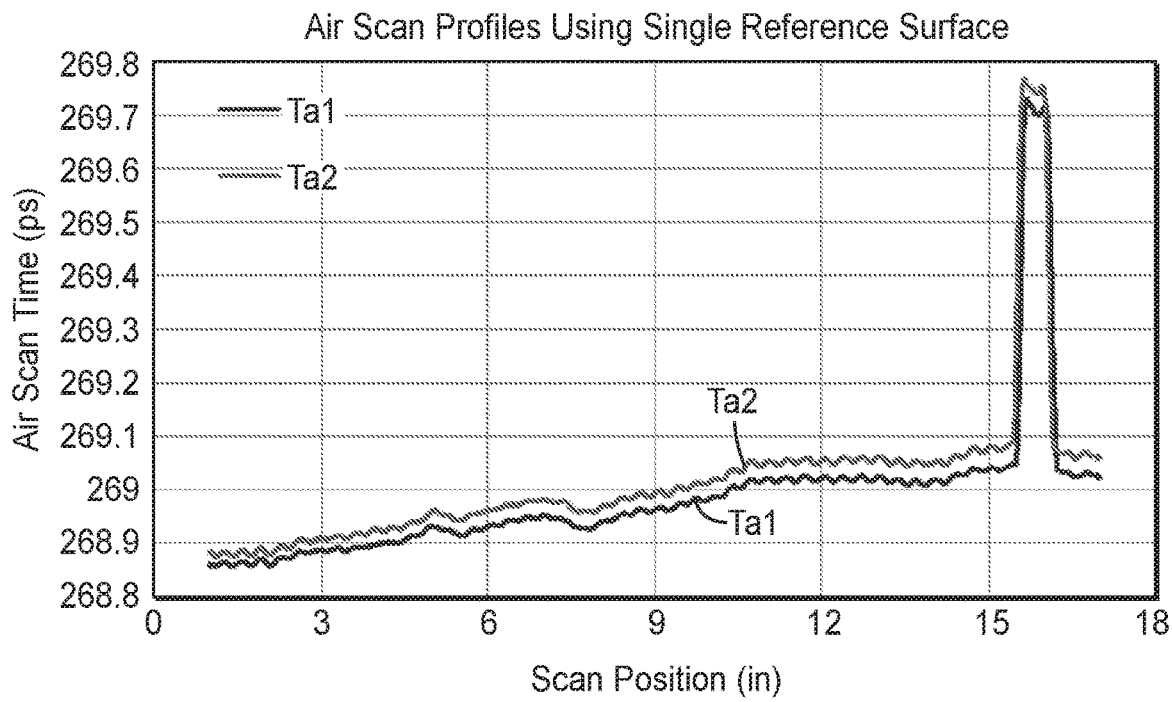
FIGS. 11A-11J show example waveforms and comparative example waveforms in accordance with the present disclosure.
Figure 11B:
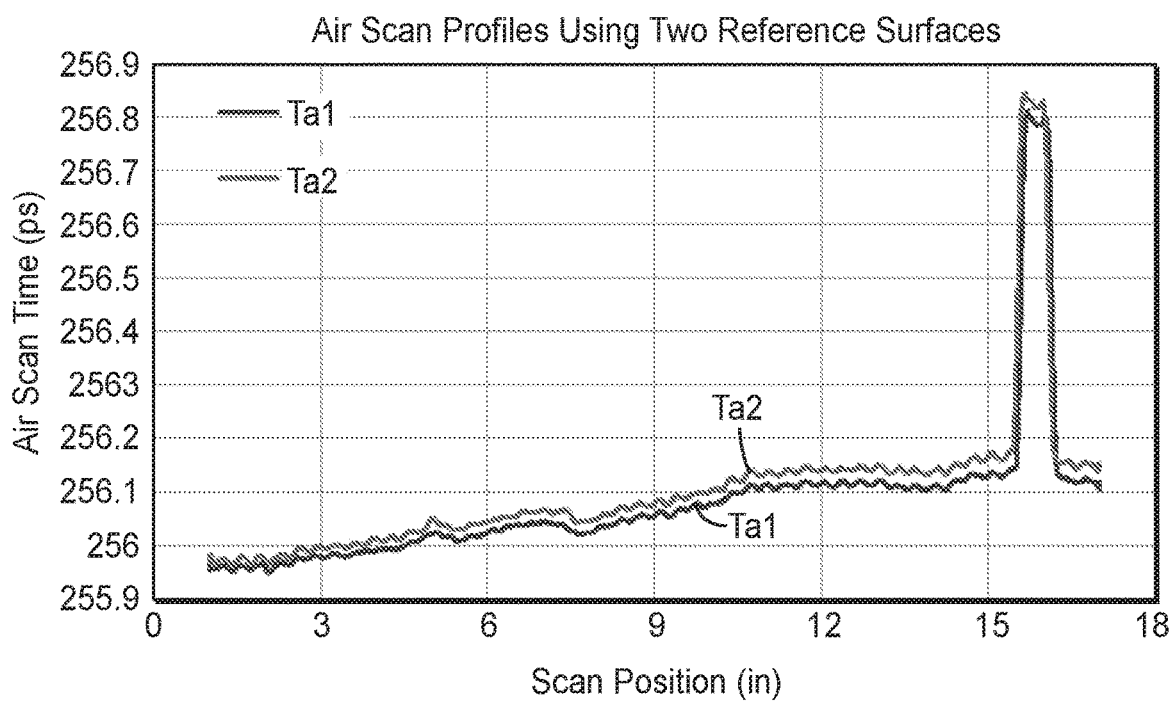
Figure 11C:
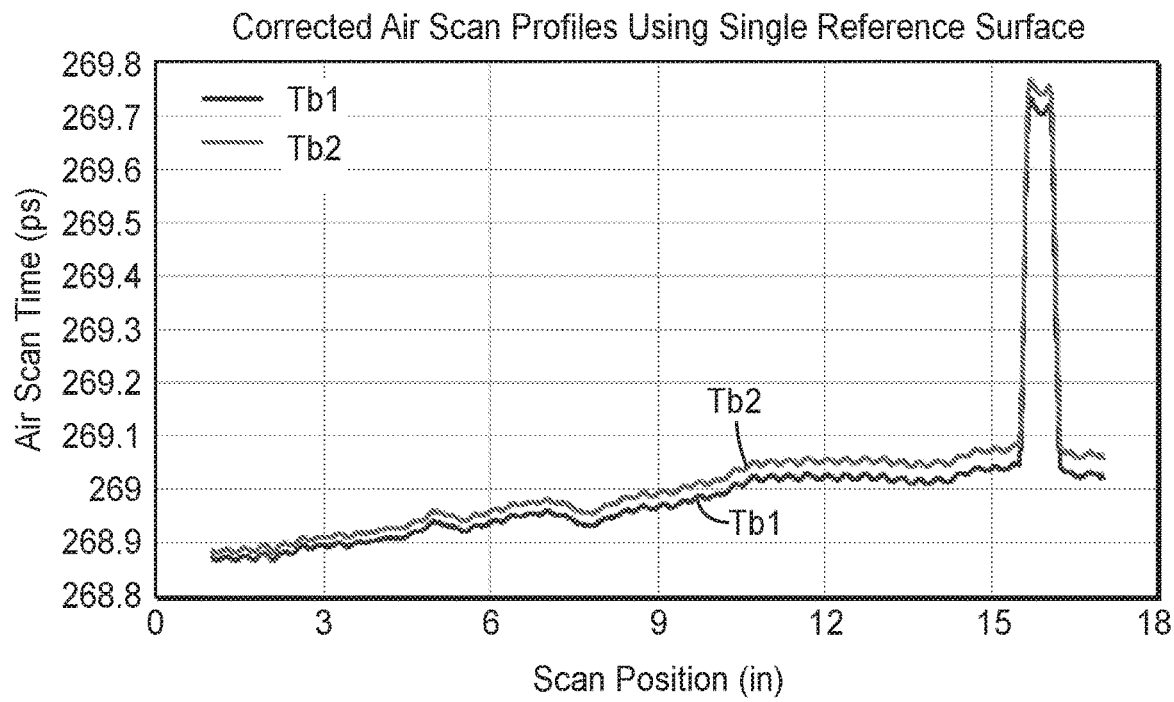
Figure 11D:
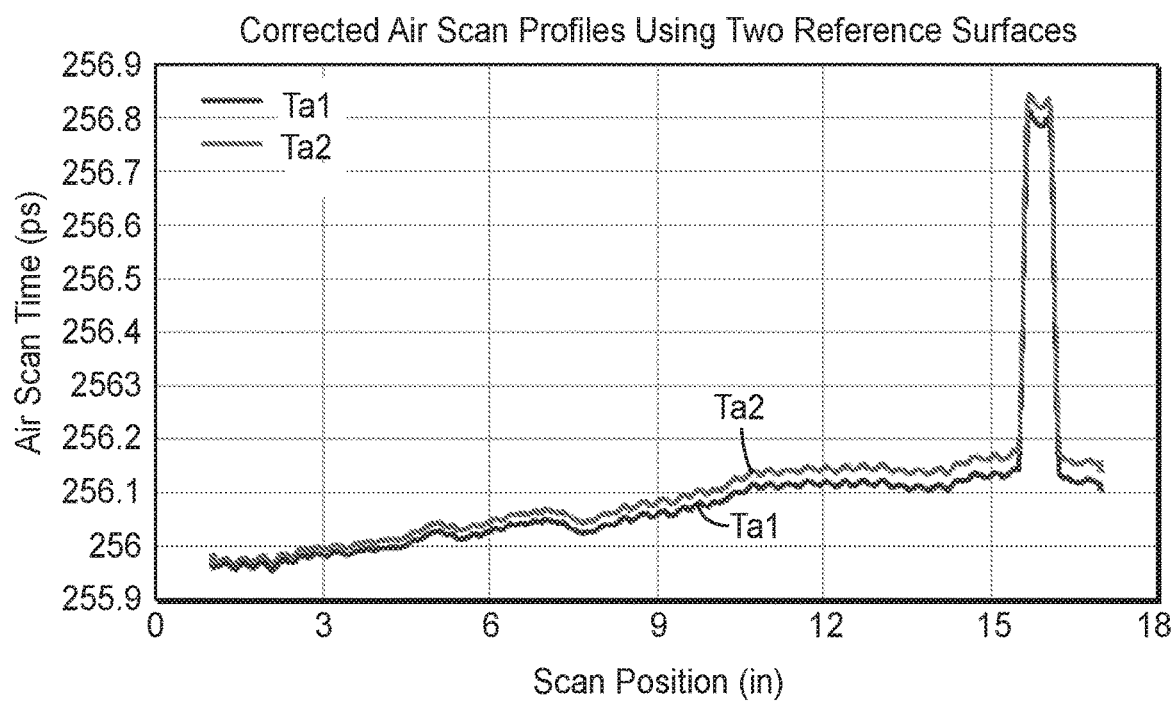

FIGS. 11A-11J show example waveforms and comparative example waveforms in accordance with the present disclosure. FIG. 11A shows two single surface air scan profiles, taken at time $T_{a1}$ (just before the first sample scan which occurred at time $T_{b1}$) and then again at time $T_{a2}$ (just after the second sample scan at time $T_{b2}$). A small shift may be seen between times $T_{a1}$ and $T_{a2}$ in this Example. FIG. 11B shows the same two air scan profiles taken at times $T_{a1}$ and $T_{a2}$ using a conventional two reference surface measurement (note change in y-axis scale from the single surface data of FIG. 11A). FIGS. 11C and 11D show two-point-corrected air scan profiles for the sample scan times computed using the air scan data at time $T_{a1}$ for a single reference surface as described by the present disclosure (FIG. 11C) and as applied to the system using two reference surfaces (FIG. 11D).

Figure 11E:
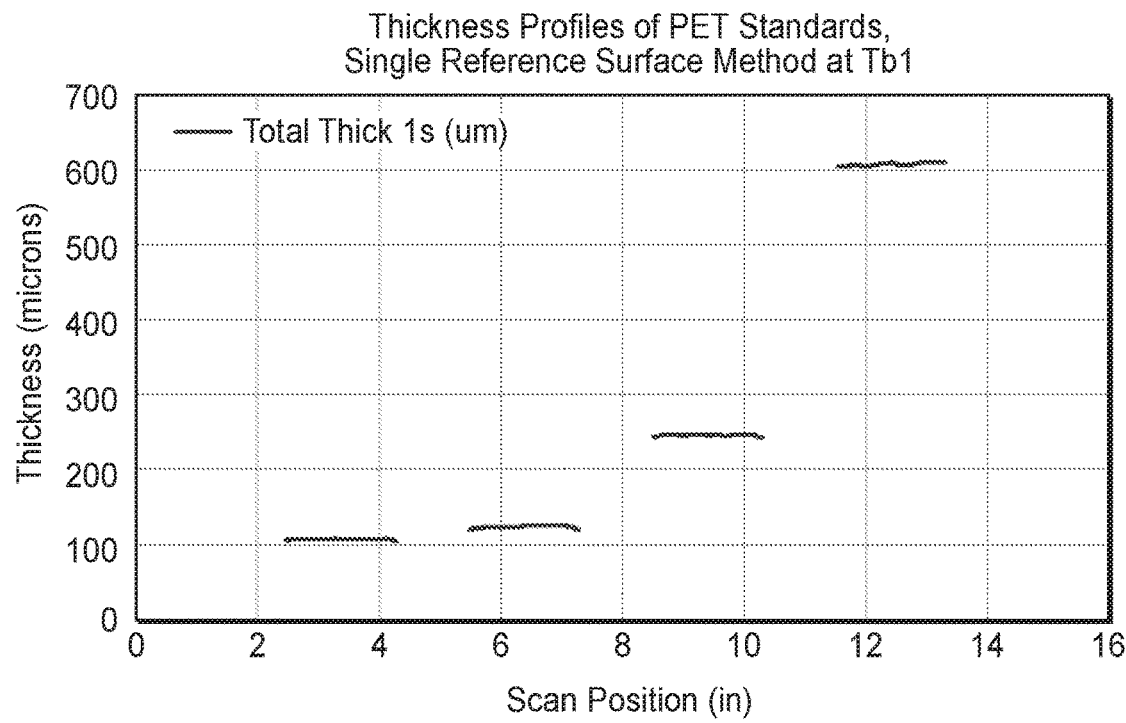
Figure 11F:
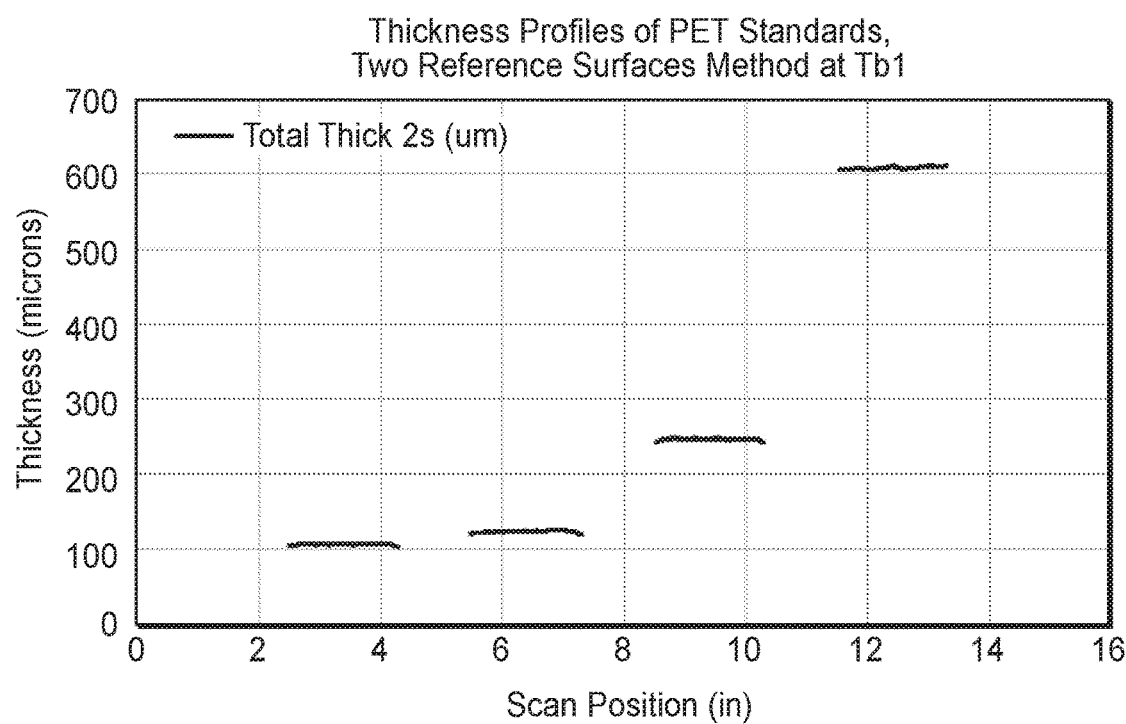
Figure 11G:
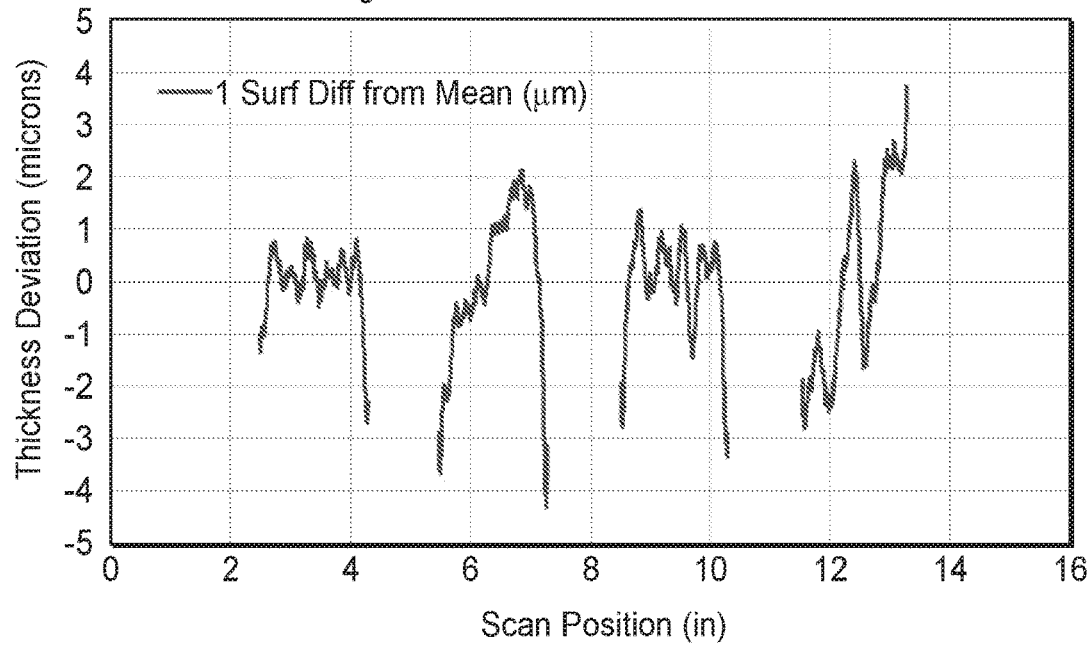
Figure 11H:
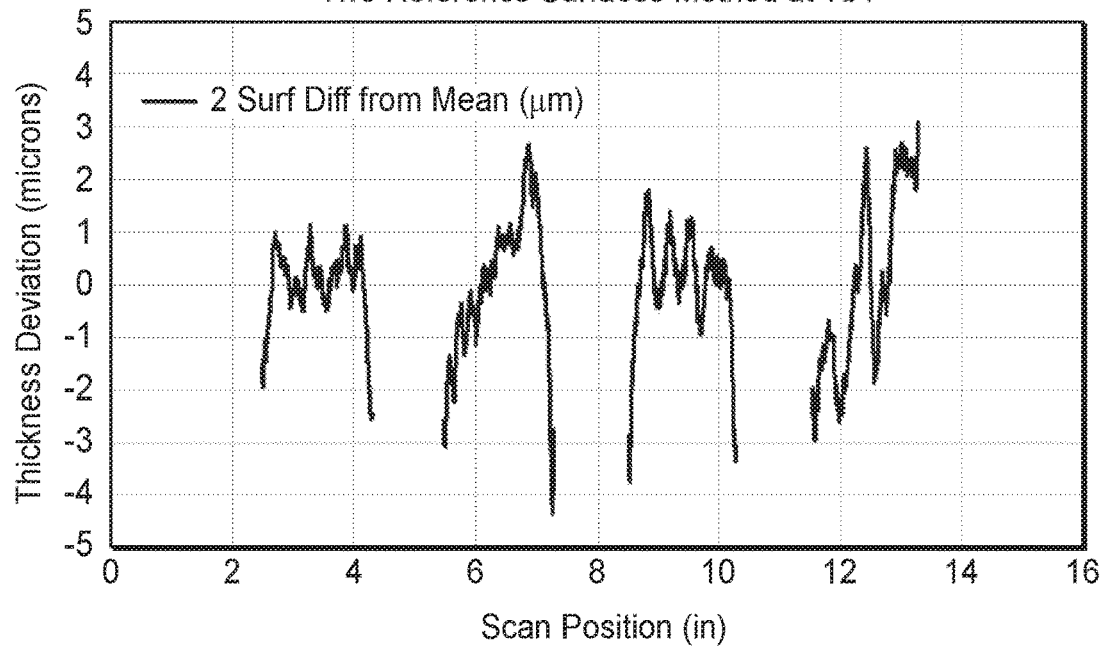
Figure 11I:
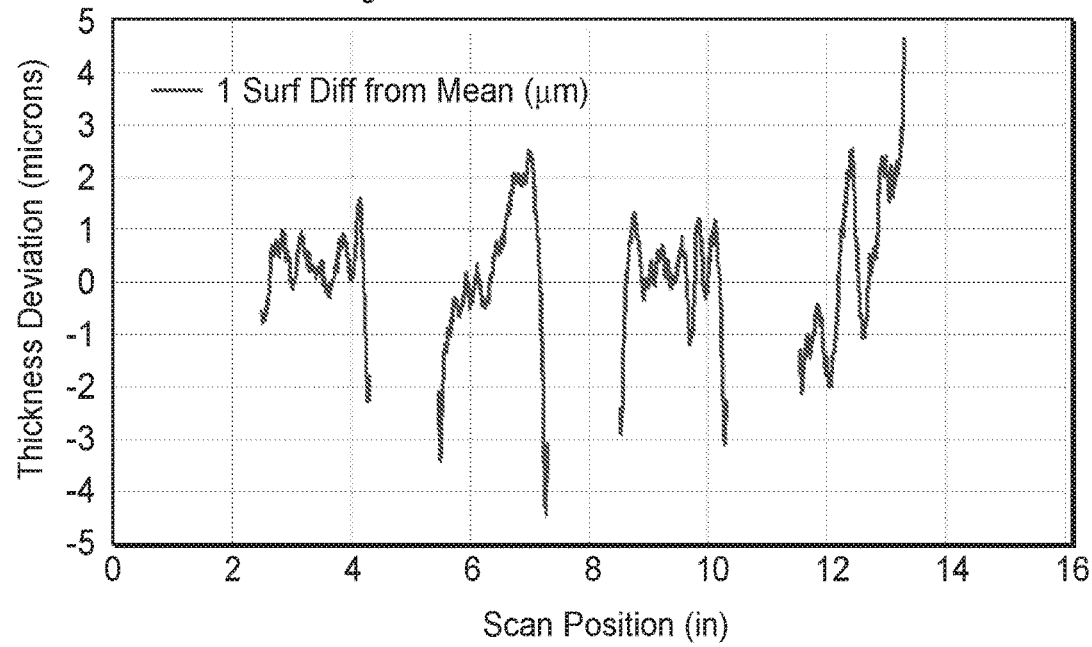
Figure 11J:
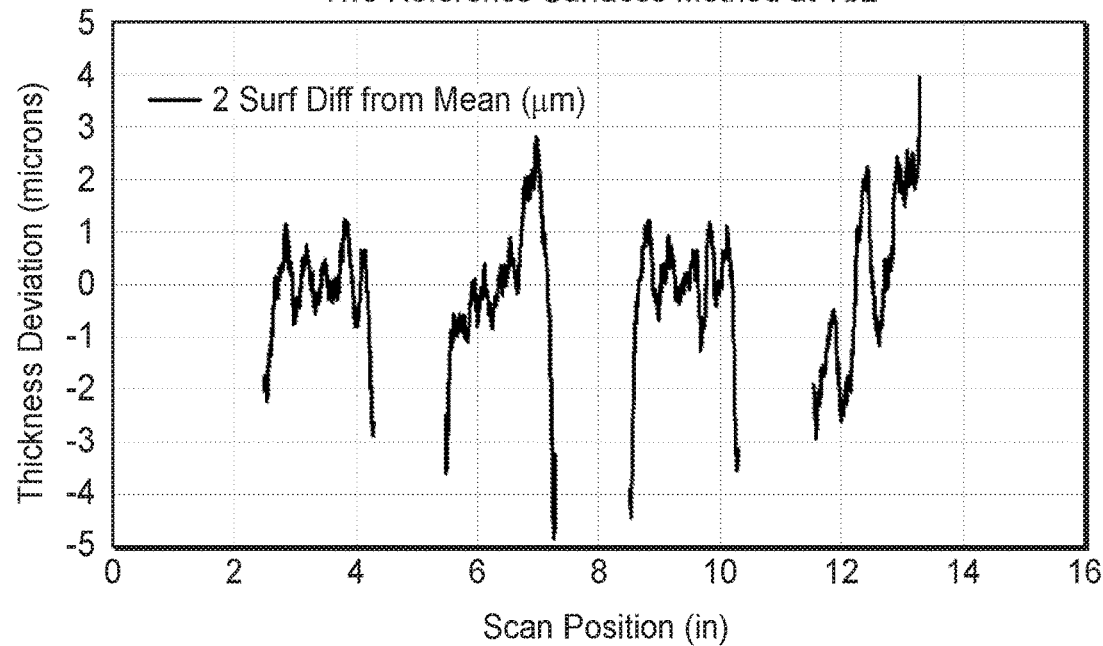

FIGS. 11E and 11F show thickness profiles of four 2" wide PET thickness standards, nominally 4, 5, 10, and 25 mils thick (moving from left to right in the figure). The thicknesses were computed using two-point corrected air scan profiles from time $T_{a1}$ shown in FIGS. 11C and 11D, respectively. FIGS. 11G and 11H show deviation profiles from the average thickness of each sample at time $T_{b1}$ measured using a single reference surface as described by the present disclosure and two reference surfaces as was known in the art, respectively. FIGS. 11I and 11J show deviation profiles from the average thickness of each sample at time $T_{b2}$ measured using a single reference surface as described by the present disclosure and two reference surfaces as was known in the art, respectively.

In the air scan profiles shown in FIGS. 11A and 11B, a 2 mil thick (~50 um), is ½" wide piece of tape is adhered to the reference beam near the end of the scan (about 16" from the start). The beam propagates through the tape before reaching the metal reference surface, which introduces an additional propagation delay in the reference surface profile. The sharp edges of the tape would allow for x-position alignment of each scan; however, due to the accuracy of the system, this was not needed for purposes of this Example. A two-point corrected air scan profile using the air scan data from the previously recorded air scan is computed every time a sample scan is collected using data from the two reference points outside the sample scan area as described by equation (6). Hence, corrected air scan profiles are computed at both times $T_{b1}$ and $T_{b2}$. Since the sample scan at $T_{b1}$ occurred fairly quickly following the air scan profile at $T_{a1}$, the corrected air scan profiles (single and two surface methods) at $T_{b1}$ essentially match the air scan profiles at $T_{a1}$ (compare the lower curves labeled $T_{a1}$ shown in FIGS. 11A and 11C and then compare the lower curves labeled $T_{b1}$ shown in FIGS. 11B and 11D.

New two-point-corrected air scan profiles (single and two surface methods) are again computed at time $T_{b2}$; note, however, that these corrected profiles still use the initial air scan profiles taken at time $T_{a1}$. Since the sample scan at time $T_{b2}$ is taken just prior to acquiring a new air scan profile at time $T_{a2}$, the corrected air scan profiles at time $T_{b2}$ should be nearly identical to the new air scan profiles at time $T_{a2}$ if the two-point corrected air scan profiles properly correct for the change in zero timing as well as any reference surface displacement. This is in fact the case, both for the single reference surface profiles, as seen by comparing the upper curves labeled $T_{a2}$ and $T_{b2}$ in FIGS. 11A and 110C, respectively, and again for the two reference surfaces profiles, as seen by comparing the upper curves labeled $T_{a2}$ and $T_{b2}$ in FIGS. 11B and 11D, respectively. If the corrected profiles were not a good approximation of the real reference surface profile, then the total thickness values computed at those times would show systematic errors from the real thickness values. The fact that the plots are nearly identical shows that the two-point correction method works across the reference beam shift that occurred between times $T_{a1}$ and $T_{a2}$ for both single reference surface and two reference surface setups.

With the corrected air scan profiles, the total sample thickness can be computed as per equation (7). The thickness profiles of each of the PET thickness standards are shown in FIGS. 11E and 11F as computed using single- and two-reference surface methods. Note that very similar results are obtained using both methods. But it is difficult to see the detail of the thickness profiles across the samples plotted this way since they have quite different thickness values. Instead, we can measure the mean thickness of each sample, and then subtract that fixed number from any sample scan that we acquire, to show the deviation of the profile measured at that time from the mean for that sample. Such deviation profiles (single and two-reference surface methods) are shown in FIGS. 11G and 11H, respectively, for the sample scan taken at time $T_{b1}$, and again in FIGS. 11I and 11J, respectively, for the sample scan taken at time $T_{b2}$. The small oscillations (<0.3 um on average) in the thickness standard profiles are due to very minute vibrations in the scanning frame system that are not repeatable across the air and sample scans. These vibrations are not even discernible to the touch, however as can be seen in FIGS. 11A-11D, the system is able to discern them. However, the gradual increases in the thickness profiles of the 5 mil and 25 mil standards are in fact real, and were verified with micrometer measurements on these samples. The fact that no bias errors are indicated for any of the thickness profiles of any of the thickness standards shows that, in fact, the two-point correction method combined with a single reference surface is applicable for obtaining accurate thickness data even in the presence of changes in zero offset or reference beam location.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

Various examples have been described. These and other examples are within the scope of the following claims.

The invention claimed is:

1. A time-domain terahertz measurement system that measures a thickness profile of a sample, comprising:
 a scanning frame;
 a single reference surface;

a terahertz transmitter that outputs terahertz interrogation pulses into a sample area between the terahertz transmitter and the single reference surface at a first time, $T_a$, when no sample is present in the sample area, and that outputs terahertz interrogation pulses into the sample area at a second time, $T_b$, when the sample is present in the sample area; and a controller that acquires an air scan profile including pulses reflected from the single reference surface corresponding to the interrogation signals output at the first time, $T_a$, and that acquires a sample scan profile including pulses reflected from the single reference surface corresponding to the interrogation pulses output at the second time, $T_b$, and including pulses reflected from the sample corresponding to the interrogation pulses output at the second time, $T_b$;

wherein the controller further acquires air distance measurements including pulses reflected at a first reference point $x_A$ on the single reference surface corresponding to the interrogation pulses output at the first time, $T_a$, and at the second time, $T_b$ and including pulses reflected at a second reference point $x_B$ on the single reference surface corresponding to the interrogation pulses output at the first time $T_a$, and at the second time, $T_b$;

wherein the first reference point $x_A$ and the second reference point $x_B$ are points on the single reference surface that are outside of the sample area;

wherein the controller further calculates a corrected air scan profile by performing a correction of the air scan profile received at the first time, $T_a$, based on the air distance measurements at points $x_A$ and $x_B$ received at the first time, $T_a$, and at the second time, $T_b$, and determines the thickness profile of the sample based on the corrected air scan profile and the sample scan profile.

2. The time-domain terahertz (THz) measurement system of claim 1 wherein the single reference surface comprises one of a substantially planar reference beam and an idler roll, optionally wherein the reference beam is comprised of a material having a coefficient of thermal expansion of less than 20.0 ppm/° C.

3. The time-domain terahertz (THz) measurement system of claim 1 further comprising:
a first support beam supporting the reference beam at a first mounting point; and
a second support beam supporting the reference beam at a second mounting point;
wherein at least one of the first mounting point and the second mounting point is a non-fixed mounting point, optionally wherein the first mounting point is a fixed mounting point and the second mounting point is a non-fixed mounting point.

4. The time-domain terahertz (THz) measurement system of claim 1 wherein the reference beam is supported at a first mounting point and at a second mounting point, and
wherein at least one of the first mounting point and the second mounting point is a non-fixed mounting point.

5. The time-domain terahertz (THz) measurement system of claim 4 wherein the non-fixed mounting point includes one of a slot and a flexure mount.

6. The time-domain terahertz (THz) measurement system of claim 1 wherein the reference beam is comprised of one of stainless steel or Invar ($Fe_{0.64}Ni_{0.36}$).

7. The time-domain terahertz (THz) measurement system of claim 1 wherein the terahertz transmitter and the terahertz receiver are housed within a terahertz probe head.

8. The time-domain terahertz (THz) measurement system of claim 7, further comprising a carriage slidably moveable along the scanning frame, the THz probe head mounted to the carriage to be slidably moveable along the scanning frame.

9. The time-domain terahertz (THz) measurement system of claim 1 wherein the controller further calculates an effective refractive index profile of the sample based on the thickness profile of the sample.

10. The time-domain terahertz (THz) measurement system of claim 1 wherein the controller further calculates at least one of a composition, a density, a mass, a void fraction, a mass fraction, a volume fraction, a mass per unit area, and a porosity of the sample based on the thickness profile of the sample.

11. The time-domain terahertz (THz) measurement system of claim 1 wherein the thickness profile of the sample is an input to control a manufacturing process.

12. The time-domain terahertz (THz) measurement system of claim 1 wherein the controller further calculates a corrected air scan profile by performing a linear correction of the air scan profile received at the first time, $T_a$, based on the air distance measurements at points $x_A$ and $x_B$ received at the first time, $T_a$, and at the second time, $T_b$.

13. A method of determining a thickness profile of a sample, comprising:
outputting terahertz interrogation pulses into a sample area of a terahertz measurement system at a first time, Ta, when no sample is present in the sample area;
receiving an air scan profile including pulses reflected from a single reference surface corresponding to the interrogation signals output at the first time, Ta;
outputting terahertz interrogation pulses into the sample area at a second time, Tb, when the sample is present in the sample area;
receiving a sample scan profile including pulses reflected from the single reference surface corresponding to the interrogation pulses output at the second time, Tb, and including pulses reflected from the sample corresponding to the interrogation pulses output at the second time, Tb;
receiving air distance measurements including pulses reflected at a first reference point xA on the single reference surface corresponding to the interrogation pulses output at the first time first time, Ta, and at the second time, Tb and including pulses reflected at a second reference point xB on the single reference surface corresponding to the interrogation pulses output at first time, Ta, and at the second time, Tb;
wherein xA and xB are points on the single reference surface that are outside of the sample area;
calculating a corrected air scan profile by performing a correction of the air scan profile received at the first time, Ta, based on the air distance measurements received at the first time, Ta, and at second time, Tb; and
determining the thickness profile of the sample based on the corrected air scan profile and the sample scan profile.

14. The method of claim 13 wherein the reference beam is comprised of a material having a coefficient of thermal expansion of less than 20.0 ppm/° C.

15. The method of claim 13 wherein the reference beam is supported at a first mounting point and at a second mounting point, and wherein at least one of the first mounting point and the second mounting point is a non-fixed mounting point.

16. The method of claim 13 wherein the first mounting point is a fixed mounting point and the second mounting point is a non-fixed mounting point.

17. The method of claim 13 further including calculating an effective refractive index profile of the sample based on the thickness profile of the sample.

18. The method of claim 13 further including calculating at least one of a composition, a density, a mass, a void fraction, a mass fraction, a volume fraction, a mass per unit area, and a porosity of the sample based on the thickness profile of the sample.

19. The method of claim 13 further comprising controlling a manufacturing process based on the thickness profile of the sample.

20. The method of claim 13 wherein calculating a corrected air scan profile includes calculating a corrected air scan profile by performing a linear correction of the air scan profile received at the first time, Ta, based on the air distance measurements received at the first time, Ta, and at second time, Tb.

* * * * *

UNITED STATES PATENT AND TRADEMARK OFFICE
CERTIFICATE OF CORRECTION

| | |
|---|---|
| PATENT NO. | : 11,143,590 B2 |
| APPLICATION NO. | : 16/947244 |
| DATED | : October 12, 2021 |
| INVENTOR(S) | : David Hofeldt |

It is certified that error appears in the above-identified patent and that said Letters Patent is hereby corrected as shown below:

In the Claims

Column 23
Line 21, In Claim 1, insert -- , -- after "$T_b$".
Line 24, In Claim 1, insert -- , -- after "first time".

Column 24
Line 2, In Claim 8, delete "," before "further comprising".
Line 29, In Claim 13, delete "Ta" and insert -- $T_a$ --, therefor.
Line 32, In Claim 13, delete "Ta" and insert -- $T_a$ --, therefor.
Line 34, In Claim 13, delete "Tb" and insert -- $T_b$ --, therefor.
Line 38, In Claim 13, delete "Tb" and insert -- $T_b$ --, therefor.
Line 41, In Claim 13, delete "Tb" and insert -- $T_b$ --, therefor
Line 43, In Claim 13, delete "xA" and insert -- $x_A$ --, therefor.
Line 45, In Claim 13, delete "output at the first time first time" and insert -- output at the first time --, therefor.
Line 45, In Claim 13, delete "Ta" and insert -- $T_a$ --, therefor.
Line 46, In Claim 13, delete "Tb" and insert -- $T_b$ --, therefor.
Line 47, In Claim 13, delete "xB" and insert -- $x_B$ --, therefor.
Line 49, In Claim 13, delete "Ta" and insert -- $T_a$ --, therefor.
Line 49, In Claim 13, delete "Tb" and insert -- $T_b$ --, therefor.
Line 50, In Claim 13, delete "xA and xB" and insert -- $x_A$ and $x_B$ --, therefor.
Line 54, In Claim 13, delete "Ta" and insert -- $T_a$ --, therefor.
Line 55, In Claim 13, delete "Ta" and insert -- $T_a$ --, therefor.
Line 55, In Claim 13, delete "at second time" and insert -- at the second time --, therefor.
Line 55, In Claim 13, delete "Tb" and insert -- $T_b$ --, therefor.

Column 25
Line 18, In Claim 20, delete "Ta" and insert -- $T_a$ --, therefor.
Line 19, In Claim 20, delete "Ta" and insert -- $T_a$ --, therefor.

Signed and Sealed this
Tenth Day of May, 2022

*Katherine Kelly Vidal*
Katherine Kelly Vidal
*Director of the United States Patent and Trademark Office*

Line 20, In Claim 20, delete "Tb" and insert -- $T_b$ --, therefor.
Line 19-20, In Claim 20, delete "at second time" and insert -- at the second time --, therefor.